(12) United States Patent
Yamada

(10) Patent No.: US 8,644,179 B2
(45) Date of Patent: Feb. 4, 2014

(54) CONTROL SYSTEM, CONTROL DEVICE, COMPOSITE SWITCH DEVICE, AND CONTROL METHOD

(75) Inventor: Akiko Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 433 days.

(21) Appl. No.: 13/049,127

(22) Filed: Mar. 16, 2011

(65) Prior Publication Data

US 2011/0228688 A1    Sep. 22, 2011

(30) Foreign Application Priority Data

Mar. 17, 2010   (JP) .................................. 2010-61603

(51) Int. Cl.
*H04L 12/26* (2006.01)
*H04L 12/50* (2006.01)
*H04L 12/28* (2006.01)

(52) U.S. Cl.
USPC ........... 370/252; 370/216; 370/245; 370/401; 370/360

(58) Field of Classification Search
USPC ........................ 370/252, 216, 245, 401, 360
See application file for complete search history.

(56) References Cited

U.S. PATENT DOCUMENTS

| 6,201,789 B1 * | 3/2001 | Witkowski et al. | 370/230 |
| 6,982,953 B1 * | 1/2006 | Swales | 370/218 |
| 2006/0227759 A1 * | 10/2006 | Bohm et al. | 370/351 |

FOREIGN PATENT DOCUMENTS

| JP | 2000-253035 | 9/2000 |
| JP | 2000253035 A * | 9/2000 |

OTHER PUBLICATIONS

Office Action of Japanese Patent Application No. 2010-061603 dated Nov. 12, 2013.

* cited by examiner

*Primary Examiner* — Jung Park
*Assistant Examiner* — Albert Shih
(74) *Attorney, Agent, or Firm* — Staas & Halsey LLP

(57) ABSTRACT

A control system and method thereof is provided. The control system includes switch devices that operate on supplied power, each switch device includes multiple switch-side ports and a communication processing unit for relaying data, input to any of the switch-side ports on a basis of destination information set for the data, a relay device that includes first ports coupled to corresponding switch-side ports of the switch devices and second ports selectively coupled to the first ports and that relays the data, input to any of the second ports, to any of the first ports, and a control device that controls the switch devices and the relay device, where the control device includes a port monitoring unit, a port-assignment control unit, and a power control unit.

20 Claims, 26 Drawing Sheets

FIG. 5

| SWITCH | PORT | STATUS | MONITOR TARGET (O/x) | OPERATED/IDLE (O/x) | DESTINATION INFORMATION |
|---|---|---|---|---|---|
| SW3-1 | 0 | CONNECTED WITH ANOTHER DEVICE | x | O | WAN CONNECTION DEVICE 13 |
| | 1 | FOR CONTROL | x | O | R4-1 |
| | 2 | NORMAL | O | O | CONTROL DEVICE 1 |
| | 3 | NORMAL | O | O | TERMINAL 5-1, TERMINAL 5-2, TERMINAL 5-3, TERMINAL 5-4, TERMINAL 5-5 SW3-3, SW3-4, R4-2 |
| SW3-2 | 0 | CONNECTED WITH ANOTHER DEVICE | x | O | WAN CONNECTION DEVICE 13 |
| | 1 | NORMAL | O | O | TERMINAL 5-6 |
| | 2 | NORMAL | O | O | TERMINAL 5-7 |
| | 3 | NOT CONNECTED | x | x | — |
| SW3-3 | 0 | CONNECTED WITH ANOTHER DEVICE | x | O | WAN CONNECTION DEVICE 13, SW 3-1, SW 3-2, R 4-1, CONTROL DEVICE 1, TERMINAL 5-6, TERMINAL 5-7, TERMINAL 5-3, TERMINAL 5-4, TERMINAL 5-5 |
| | 1 | FOR CONTROL | x | O | R4-2 |
| | 2 | NORMAL | O | O | TERMINAL 5-1 |
| | 3 | NORMAL | O | O | TERMINAL 5-2 |
| SW3-4 | 0 | CONNECTED WITH ANOTHER DEVICE | x | O | WAN CONNECTION DEVICE 13, SW 3-1, SW 3-2, R 4-1, CONTROL DEVICE 1, TERMINAL 5-6, TERMINAL 5-7, TERMINAL 5-1, TERMINAL 5-2 |
| | 1 | NORMAL | O | O | TERMINAL 5-3 |
| | 2 | NORMAL | O | O | TERMINAL 5-4 |
| | 3 | NORMAL | O | O | TERMINAL 5-5 |

FIG. 6

| RELAY DEVICE | PORT | CONNECTION TARGET |
|---|---|---|
| R4-1 | A0 | PORT 0 OF SW 3-1 |
| | A1 | PORT 2 OF SW 3-1 |
| | A2 | PORT 3 OF SW 3-1 |
| | A3 | PORT 0 OF SW 3-2 |
| | A4 | PORT 1 OF SW 3-2 |
| | A5 | PORT 2 OF SW 3-2 |
| | A6 | PORT 3 OF SW 3-2 |
| | B0 | WAN CONNECTION DEVICE 13 |
| | B1 | CONTROL DEVICE 1 |
| | B2 | COMPOSITE SWITCH DEVICE 2-2 |
| | B3 | — |
| | B4 | TERMINAL 5-6 |
| | B5 | TERMINAL 5-7 |
| | B6 | — |

FIG. 7

| RELAY DEVICE | PORT | CONNECTION TARGET |
|---|---|---|
| R4-2 | A0 | PORT 0 OF SW 3-3 |
| | A1 | PORT 2 OF SW 3-3 |
| | A2 | PORT 3 OF SW 3-3 |
| | A3 | PORT 0 OF SW 3-4 |
| | A4 | PORT 1 OF SW 3-4 |
| | A5 | PORT 2 OF SW 3-4 |
| | A6 | PORT 3 OF SW 3-4 |
| | B0 | COMPOSITE SWITCH DEVICE 2-1 |
| | B1 | TERMINAL 5-1 |
| | B2 | TERMINAL 5-2 |
| | B3 | — |
| | B4 | TERMINAL 5-3 |
| | B5 | TERMINAL 5-4 |
| | B6 | TERMINAL 5-5 |

FIG. 8

| RELAY DEVICE | PORT | CONNECTION TARGET PORT | CHANGEABILITY (O/×) |
|---|---|---|---|
| R4-1 | B0 | A0,A3 | × |
| | B1 | A1 | O |
| | B2 | A2 | O |
| | B3 | — | O |
| | B4 | A4 | O |
| | B5 | A5 | O |
| | B6 | A6 | O |

FIG. 9

| RELAY DEVICE | PORT | CONNECTION TARGET PORT | CHANGEABILITY (O/×) |
|---|---|---|---|
| R4-2 | B0 | A0,A3 | × |
| | B1 | A1 | O |
| | B2 | A2 | O |
| | B3 | — | O |
| | B4 | A4 | O |
| | B5 | A5 | O |
| | B6 | A6 | O |

FIG. 11

| SWITCH | PORT | STATUS | MONITOR TARGET (O/x) | OPERATED/IDLE (O/x) | DESTINATION INFORMATION |
|---|---|---|---|---|---|
| SW3-1 | 0 | CONNECTED WITH ANOTHER DEVICE | x | O | WAN CONNECTION DEVICE 13 |
| | 1 | FOR CONTROL | x | O | R4-1 |
| | 2 | NORMAL | O | O | CONTROL DEVICE 1 |
| | 3 | NORMAL | O | O | SW3-3, SW3-4, R4-2, TERMINAL 5-5 |
| SW3-2 | 0 | CONNECTED WITH ANOTHER DEVICE | x | O | WAN CONNECTION DEVICE 13 |
| | 1 | NORMAL | O | O | TERMINAL 5-6 |
| | 2 | NORMAL | O | O | TERMINAL 5-7 |
| | 3 | NOT CONNECTED | x | x | — |
| SW3-3 | 0 | CONNECTED WITH ANOTHER DEVICE | x | O | WAN CONNECTION DEVICE 13, SW 3-1, SW 3-2, R 4-1, CONTROL DEVICE 1, TERMINAL 5-6, TERMINAL 5-7, TERMINAL 5-5 |
| | 1 | FOR CONTROL | x | O | R4-2 |
| | 2 | NORMAL | O | x | TERMINAL 5-1 |
| | 3 | NORMAL | O | x | TERMINAL 5-2 |
| SW3-4 | 0 | CONNECTED WITH ANOTHER DEVICE | x | O | WAN CONNECTION DEVICE 13, SW 3-1, SW 3-2, R 4-1, CONTROL DEVICE 1, TERMINAL 5-6, TERMINAL 5-7 |
| | 1 | NORMAL | O | x | TERMINAL 5-3 |
| | 2 | NORMAL | O | x | TERMINAL 5-4 |
| | 3 | NORMAL | O | O | TERMINAL 5-5 |

FIG. 13

| RELAY DEVICE | PORT | CONNECTION TARGET |
|---|---|---|
| R4-2 | A0 | PORT 0 OF SW 3-3 |
| | A1 | PORT 2 OF SW 3-3 |
| | A2 | PORT 3 OF SW 3-3 |
| | A3 | PORT 0 OF SW 3-4 |
| | A4 | PORT 1 OF SW 3-4 |
| | A5 | PORT 2 OF SW 3-4 |
| | A6 | PORT 3 OF SW 3-4 |
| | B0 | COMPOSITE SWITCH DEVICE 2-1 |
| | B1 | TERMINAL 5-1 |
| | B2 | TERMINAL 5-2 |
| | B3 | — |
| | B4 | TERMINAL 5-3 |
| | B5 | TERMINAL 5-4 |
| | B6 | TERMINAL 5-5 |

FIG. 14

| PORT | CONNECTION SWITCH | MONITOR TARGET | OPERATED/IDLE (O/×) |
|---|---|---|---|
| A0 | SW3-3 | | |
| A1 | | O | × |
| A2 | | O | × |
| A3 | SW3-4 | | |
| A4 | | O | × |
| A5 | | O | × |
| A6 | | O | O |

FIG. 15

BEFORE PORT-ASSIGNMENT CHANGE

| RELAY DEVICE | PORT | CONNECTION TARGET PORT | CHANGEABILITY (O/x) |
|---|---|---|---|
| R4-2 | B0 | A0,A3 | x |
| | B1 | A1 | O |
| | B2 | A2 | O |
| | B3 | – | O |
| | B4 | A4 | O |
| | B5 | A5 | O |
| | B6 | A6 | O |

AFTER PORT-ASSIGNMENT CHANGE

| RELAY DEVICE | PORT | CONNECTION TARGET PORT | CHANGEABILITY (O/x) |
|---|---|---|---|
| R4-2 | B0 | A0,A3 | x |
| | B1 | A6 | O |
| | B2 | A2 | O |
| | B3 | – | O |
| | B4 | A4 | O |
| | B5 | A5 | O |
| | B6 | A1 | O |

FIG. 17

| SWITCH | PORT | STATUS | MONITOR TARGET (O/x) | OPERATED/IDLE (O/x) | DESTINATION INFORMATION |
|---|---|---|---|---|---|
| SW3-1 | 0 | CONNECTED WITH ANOTHER DEVICE | x | O | WAN CONNECTION DEVICE 13 |
| | 1 | FOR CONTROL | x | O | R4-1 |
| | 2 | NORMAL | O | O | CONTROL DEVICE 1 |
| | 3 | NORMAL | O | O | SW3-3,SW3-4,R4-2,TERMINAL 5-5 |
| SW3-2 | 0 | CONNECTED WITH ANOTHER DEVICE | x | O | WAN CONNECTION DEVICE 13 |
| | 1 | NORMAL | O | O | TERMINAL 5-6 |
| | 2 | NORMAL | O | O | TERMINAL 5-7 |
| | 3 | NOT CONNECTED | x | x | - |
| SW3-3 | 0 | CONNECTED WITH ANOTHER DEVICE | x | O | WAN CONNECTION DEVICE 13, SW 3-1, SW 3-2, R 4-1, CONTROL DEVICE 1, TERMINAL 5-6, TERMINAL 5-7, TERMINAL 5-5 |
| | 1 | FOR CONTROL | x | O | R4-2 |
| | 2 | NORMAL | O | O | TERMINAL 5-5 |
| | 3 | NORMAL | O | x | TERMINAL 5-2 |
| SW3-4 | 0 | CONNECTED WITH ANOTHER DEVICE | x | O | WAN CONNECTION DEVICE 13, SW 3-1, SW 3-2, R 4-1, CONTROL DEVICE 1, TERMINAL 5-6, TERMINAL 5-7 |
| | 1 | NORMAL | O | x | TERMINAL 5-3 |
| | 2 | NORMAL | O | x | TERMINAL 5-4 |
| | 3 | NORMAL | O | x | |

FIG. 18

| PORT | CONNECTION SWITCH | MONITOR TARGET | OPERATED/IDLE (O/×) |
|---|---|---|---|
| A0 | SW3-3 (OPERATED) | | |
| A1 | | O | O |
| A2 | | O | × |
| A3 | SW3-4 (POWER OFF) | | |
| A4 | | O | × |
| A5 | | O | × |
| A6 | | O | × |

FIG. 22

| SWITCH | PORT | STATUS | MONITOR TARGET (O/x) | OPERATED/IDLE (O/x) | DESTINATION INFORMATION |
|---|---|---|---|---|---|
| SW3-1 | 0 | CONNECTED WITH ANOTHER DEVICE | x | O | WAN CONNECTION DEVICE 13 |
|  | 1 | FOR CONTROL | x | O | R4-1 |
|  | 2 | NORMAL | O | O | CONTROL DEVICE 1 |
|  | 3 | NORMAL | O | O | SW3-3,SW3-4,R4-2,TERMINAL 5-5 |
| SW3-2 | 0 | CONNECTED WITH ANOTHER DEVICE | x | O | WAN CONNECTION DEVICE 13 |
|  | 1 | NORMAL | O | O | TERMINAL 5-6 |
|  | 2 | NORMAL | O | O | TERMINAL 5-7 |
|  | 3 | NOT CONNECTED | x | x | – |
| SW3-3 | 0 | CONNECTED WITH ANOTHER DEVICE | x | O | WAN CONNECTION DEVICE 13, SW 3-1, SW 3-2, R 4-1, CONTROL DEVICE 1, TERMINAL 5-6, TERMINAL 5-7, TERMINAL 5-5 |
|  | 1 | FOR CONTROL | x | O | R4-2 |
|  | 2 | NORMAL | O | O | TERMINAL 5-5 |
|  | 3 | FOR MONITOR | O | x | TERMINAL 5-2, TERMINAL 5-1, TERMINAL 5-3, TERMINAL 5-4 |
| SW3-4 | 0 | CONNECTED WITH ANOTHER DEVICE | x | O | WAN CONNECTION DEVICE 13, SW 3-1, SW 3-2, R 4-1, CONTROL DEVICE 1, TERMINAL 5-6, TERMINAL 5-7 |
|  | 1 | NORMAL | O | x |  |
|  | 2 | NORMAL | O | x |  |
|  | 3 | NORMAL | O | x |  |

FIG. 25

BEFORE PORT-ASSIGNMENT CHANGE

| RELAY DEVICE | PORT | CONNECTION TARGET PORT | CHANGEABILITY (O/x) |
|---|---|---|---|
| R4-2 | B0 | A0,A3 | x |
| | — | A6 | O |
| | B2,B1,B4,B5 | A2 | O |
| | B3 | — | O |
| | — | A4 | O |
| | — | A5 | O |
| | B6 | A1 | O |

AFTER PORT-ASSIGNMENT CHANGE

| RELAY DEVICE | PORT | CONNECTION TARGET PORT | CHANGEABILITY (O/x) |
|---|---|---|---|
| R4-2 | B0 | A0,A3 | x |
| | — | A6 | O |
| | B1,B4,B5 | A2 | O |
| | B3 | — | O |
| | B2 | A4 | O |
| | — | A5 | O |
| | B6 | A1 | O |

CONTROL SYSTEM, CONTROL DEVICE, COMPOSITE SWITCH DEVICE, AND CONTROL METHOD

CROSS-REFERENCE TO RELATED APPLICATION

This application is based upon and claims the benefit of priority from the prior Japanese Patent Application No. 2010-61603 filed on Mar. 17, 2010, the entire contents of which are incorporated herein by reference.

FIELD

The embodiments discussed herein relate to a control system, a control device, a composite switch device, and a control method.

BACKGROUND

In communications networks such as LANs (local area networks), typical LAN switches relay received data to ports corresponding to destination information, such as MAC (media access control) addresses, set in the header portions of the data.

With respect to LAN switches, for example, Japanese Unexamined Patent Application Publication No. 2000-253035 discusses a technology in which, of ports coupled to communication control means of multiple systems, ports from which data inputs are detected are collectedly coupled to the communication control means of one of the systems and supply of power to the remaining communication control means is stopped.

SUMMARY

According to an aspect of the invention, a control system includes switch devices that operate on supplied power, each switch device including multiple switch-side ports and a communication processing unit for relaying data, input to any of the switch-side ports on a basis of destination information set for the data, a relay device that includes first ports coupled with a corresponding switch-side ports of the switch devices and second ports selectively coupled to the first ports and that relays the data, input to any of the second ports, to any of the first ports, and a control device that controls the switch devices and the relay device. Where the control device includes a port monitoring unit that monitors usage states of the switch-side ports of each switch device, a port-assignment control unit that controls, on a basis of a result of the monitoring performed by the port-monitoring unit, switching of connections between the second ports and the first ports of the relay device so that ports included in the second ports and coupled via any of the first ports to the ports that are included in the switch-side ports of the switch devices and that are not in use are collectively coupled to at least one of the switch devices, and a power control unit that stops a supply of the power to the at least one switch device in which all of the switch-side ports are put into non-used states by the switching control of the port-assignment control unit.

Objects and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 illustrates one example of port-state information in the control system illustrated in FIG. 4;

FIG. 6 illustrates one example of composite-switch-device information in the control system illustrated in FIG. 4;

FIG. 7 illustrates another example of composite-switch-device information in the control system illustrated in FIG. 4;

FIG. 8 illustrates one example of port-assignment information in the control system illustrated in FIG. 4;

FIG. 9 illustrates another example of port-assignment information in the control system illustrated in FIG. 4;

FIG. 11 illustrates one example of port-state information in the control system illustrated in FIG. 10;

FIG. 13 illustrates one example of composite-switch-device information in the control system illustrated in FIG. 10;

FIG. 14 is a diagram illustrating an example of extraction of the composite-switch-device information illustrated in FIG. 13;

FIG. 15 illustrates one example of port-assignment information before and after a port-assignment change processing;

FIG. 17 illustrates one example of port-state information;

FIG. 18 illustrates one example of extraction of composite-switch-device information;

FIG. 22 illustrates one example of port-state information;

FIG. 25 illustrates one example of port-assignment information before and after the port-assignment change processing.

DETAILED DESCRIPTION OF THE EMBODIMENTS

Figure 1:
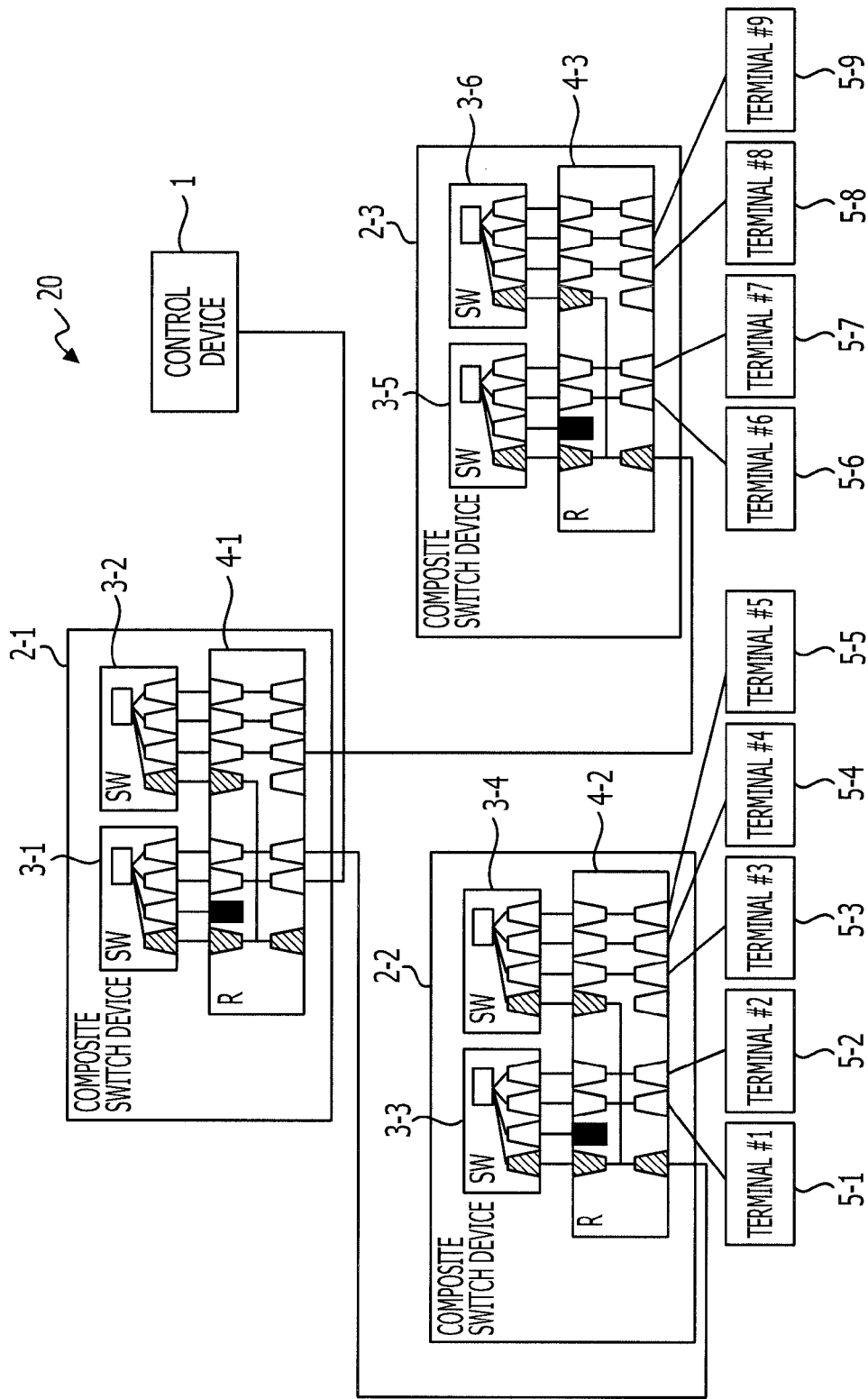
FIG. 1 is a diagram illustrating an example of a network including a control system according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Since the above-described technology allows for only stopping of power to a portion of the elements of the LAN switches, there are cases in which a significant reduction in the amount of power consumed cannot be achieved.

Accordingly, one object of the present invention is to reduce the amount of power consumed by a system.

Embodiments will be described below with reference to the accompanying drawings. The embodiments described below are merely illustrative and exemplary and are not aimed to exclude various modifications and technical applications that are not explicitly described herein. That is, the embodiments described below can be implemented in various forms (e.g., a combination of an embodiment and a modification) within the scope not departing from the spirit of the embodiments described below.

Various Examples of Configuration of Control System are Set Forth Below.

FIG. 1 is a diagram illustrating one example of a configuration of a network including a control system 20 according to one embodiment.

The network illustrated in FIG. 1 includes the control system 20 and terminals 5-1 to 5-9 (5-1, 5-2, 5-3, 5-4, 5-5, 5-6, 5-7, 5-8 and 5-9). The control system 20 has a control device 1 and composite switch devices 2-1 to 2-3 (2-1, 2-2 and 2-3). The control system 20 may have a configuration in which at least one composite switch device 2-1 is coupled to the control device 1.

In the example illustrated in FIG. 1, the control device 1 and the composite switch devices 2-2 and 2-3 are intercoupled via the composite switch device 2-1. The terminals 5-1 to 5-5 are coupled to the composite switch device 2-2 and the terminals 5-6 to 5-9 are coupled to the composite switch device 2-3.

The network configuration illustrated in FIG. 1 is merely one example, and may employ a ring topology, a mesh topology, a star topology, a bus topology, or an appropriate combination thereof, other than the tree topology illustrated in FIG. 1.

The composite switch device 2-1 has multiple input/output ports, and relays data, input from one of the input/output ports, to any of the input/output ports.

The composite switch device 2-1 has, for example, switch devices 3-1 and 3-2 and a relay device 4-1 that relays data between the switch devices 3-1 and 3-2 and the input/output ports.

Each of the switch devices 3-1 and 3-2 has switch-side ports and a communication processing unit. The communication processing unit relays data, input to any of the switch-side ports, to any of the switch-side ports, on the basis of destination information set for the data. Data is exchanged including via the communication processing unit. The switch devices 3-1 to 3-2 operate on, for example, power supplied from a power supply or the like. The destination information may be, for example, MAC address information set for data, an IP (internet protocol) address, or terminal identification information. The communication processing unit may be a switch circuit implemented by an LSI (large scale integration) or the like.

The relay device 4-1 has first ports coupled to the switch-side ports of the switch devices 3-1 and 3-2 and second ports selectively coupled to the first ports. The relay device 4-1 relays the data, input to any port of the second ports, to any of the first ports. The relay device 4-1 may also be operated on, for example, power supplied from a power supply or the like.

For example, the relay device 4-1 relays the data, input to any of the second ports, to any of the first ports. The second ports may function as, for example, input/output ports for the composite switch device 2-1. The relay device 4-1 may have a connection switching portion (indicated by a black rectangle in FIG. 1) for switching between the first ports and the second ports.

The switch-side ports of the switch devices 3-1 and 3-2 are coupled with the first ports that the relay device 4-1 have adjacent to the switch devices 3-1 and 3-2.

When data is input to any of the second ports, the relay device 4-1 can relay the data to the switch device 3-1 or 3-2 via any of the first ports.

Each of the switch devices 3-1 and 3-2 receives data from the relay device 4-1 via any of the switch-side ports, and relays the data to any of the switch-side ports on the basis of the destination information set for the data.

The relay device 4-1 further relays the data, received from the switch device 3-1 or 3-2 via any of the first ports, to the port included in the second ports and selectively coupled to any of the first ports.

With this arrangement, the composite switch device 2-1 can relay data, input to any of the input/output ports, to any of the input/output ports in accordance with the destination information set for the data. As a result, the composite switch device 2-1 can transmit/receive data to/from the other composite switch devices 2-2 and 2-3, the control device 1, the terminals 5-1 to 5-9, and so on.

The terminals 5-1 to 5-9 may be transmission devices for transmitting/receiving data. Examples of the terminals 5-1 to 5-9 include user devices, such as stationary terminals and mobile terminals, carrier devices, such as base-station devices, and network equipment, such as bridges and routers.

The composite switch device 2-2 includes switch devices 3-3 and 3-4 having substantially the same function as the switch devices 3-1 and 3-2 and a relay device 4-2 having substantially the same function as the relay device 4-1. Thus, the composite switch device 2-2 has substantially the same function as the composite switch device 2-1.

In addition, the composite switch device 2-3 includes switch devices 3-5 and 3-6 having substantially the same function as the switch devices 3-1 to 3-4 and a relay device 4-3 having substantially the same function as the relay devices 4-1 and 4-2. Thus, the composite switch device 2-3 has substantially the same function as the composite switch devices 2-1 and 2-2.

Hereinafter, the composite switch devices 2-1 to 2-3 may be simply referred to as "composite switch devices 2" when no distinction is made therebetween and the switch devices 3-1 to 3-6 may be simply referred to as "switch devices 3" when no distinction is made therebetween. In addition, the relay devices 4-1 to 4-3 may be simply referred to as "relay devices 4" when no distinction is made therebetween and the terminals 5-1 to 5-9 may be simply referred to as "terminals 5" when no distinction is made therebetween. Hereinafter, the switch devices 3 may be referred to as "SWs 3" and the relay devices 4 may be referred to as "Rs 4".

Needless to say, the number of composite switch devices 2, the number of SWs 3, the number of Rs 4, and the number of terminals 5 are not limited to the numbers illustrated in FIG. 1.

Example of Configuration of Composite Switch Device 2 is Set Forth Below in Detail.

An example of the configuration of the composite switch device 2 will now be described with reference to FIG. 2. Since the configurations of the switch devices 2-1 to 2-3 are substantially the same, the composite switch device 2-1 will now be described by way of example.

As described above, the composite switch device 2-1 has the SWs 3-1 and 3-2 and the R 4-1.

The SWs 3-1 and 3-2 have corresponding switch-side ports "0" to "3" (ports 0, 1, 2 and 3) and corresponding communication processing units 15-1 and 15-2. Each of communication processing units 15-1 and 15-2 relays data, input to any of the corresponding switch-side ports "0" to "3", to any of the switch-side ports "0" to "3", on the basis of the destination information set for the data.

The switch-side ports "0" to "3" and the communication processing units 15-1 and 15-2 may be driven on, for example, power supplied from a power supply 16.

The power supply 16 supplies drive power to the switch-side ports "0" to "3" and the communication processing units 15-1 and 15-2 which are included in the SWs 3. The power supply 16 may be provided outside or inside the composite switch device 2-1. The power supply 16 may be shared by the SWs 3 or may be provided for each SW 3.

The R 4-1 has first ports "A0" to "A6" (ports A0, A1, A2, A3, A4, A5 and A6) coupled to the switch-side ports "0" to "3" of the SWs 3 and second ports "B0" to "B6" (ports B0, B1, B 2, B3, B4, B5 and B6) selectively coupled to the first ports "A0" to "A6". The R 4-1 relays the data, input to any of the second ports "B0" to "B6", to any of the first ports "A0" to "A6".

Thus, the R 4-1 may have a connection switching portion 12 (indicated by a black rectangle in FIG. 2) for performing switching between the first ports "A0" to "A6" and the second ports "B0" to "B6".

The R 4-1 may be implemented by a latching relay circuit.

Figure 2:
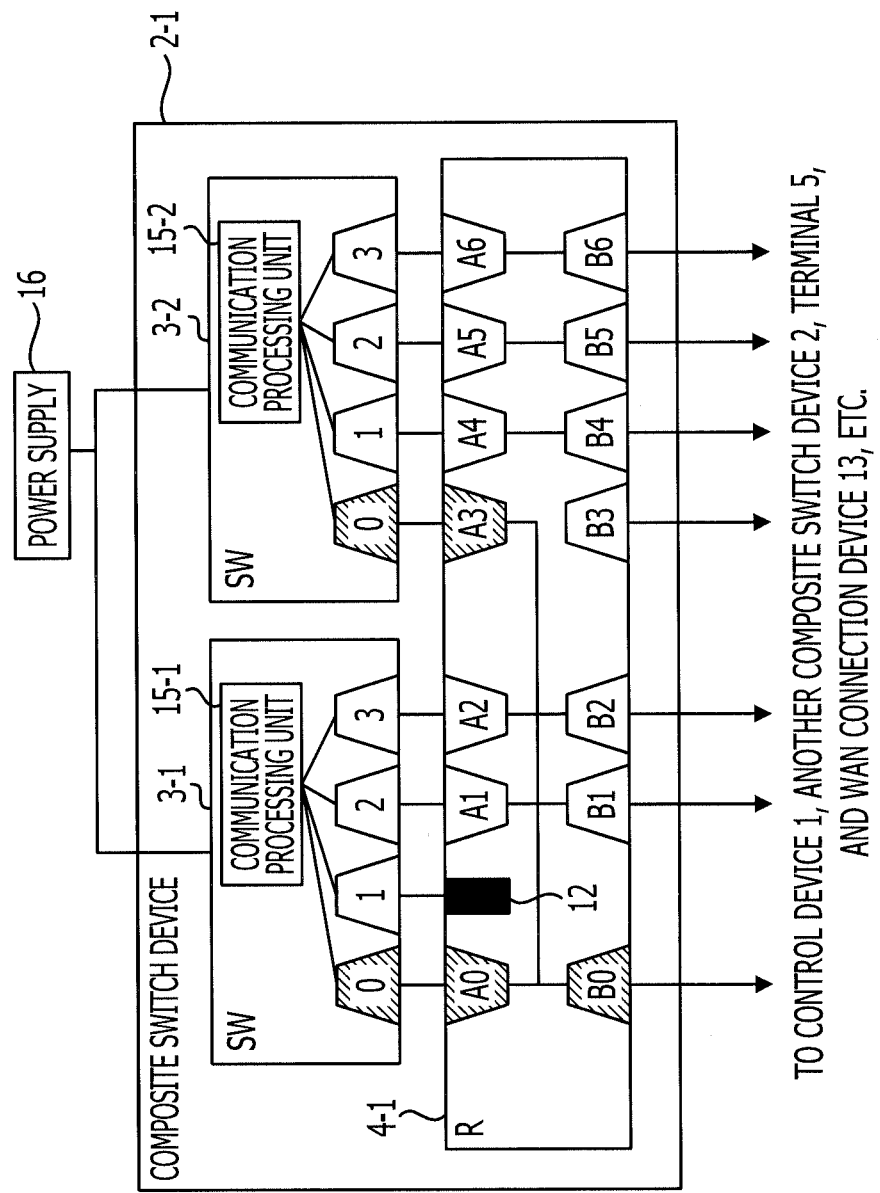
FIG. 2 is a diagram illustrating one example of a configuration of a composite switch device illustrated in FIG. 1.

In the example illustrated in FIG. 2, the switch-side ports "0", "1", "2", and "3" of the SW 3-1 are coupled with the port "A0", the connection switching portion 12, the port "A1", and the port "A2", respectively, of the R 4-1.

The switch-side ports "0", "1", "2", and "3" of the SW 3-2 are also coupled with the ports "A3", "A4", "A5", and "A6", respectively, of the R 4-1.

In the R 4-1, the ports "A1", "A2", "A4", "A5", and "A6" are coupled with the ports "B1", "B2", "B4", "B5", and "B6", respectively, and the ports "A0" and "A3" are coupled with the port "B0".

The second ports "B0" to "B6" are coupled with, for example, the control device 1, the other composite switch devices 2, the terminals 5, and a WAN (wide area network) connection device 13 described below. The switch-side port "0", the first ports "A0" and "A3", and the second port "B0" (which are indicated by hatching in FIG. 2) may be coupled with, for example, the composite switch devices 2-2 and 2-3, another network, and so on.

In the composite switch device 2 described above, for example, the connection switching portion 12 switches connections between the second ports "B0" to "B6" of the R 4-1 and the first ports "A0" to "A6", in accordance with an instruction from the control device 1 or independently from the control device 1.

With this arrangement, the composite switch device 2 can relay the data, input from any of the second ports of the R 4, to any of the second ports, on the basis of the destination information set for the data.

Example of Configuration of Control Device 1 is Set Forth in Detail Below.

An example of the configuration of the control device 1 will now be described with reference to FIG. 3.

The control device 1 controls the SWs 3 and the Rs 4. In the example illustrated in FIG. 1, the control device 1 controls the SWs 3 and the R 4 in each composite switch device 2.

Figure 3:
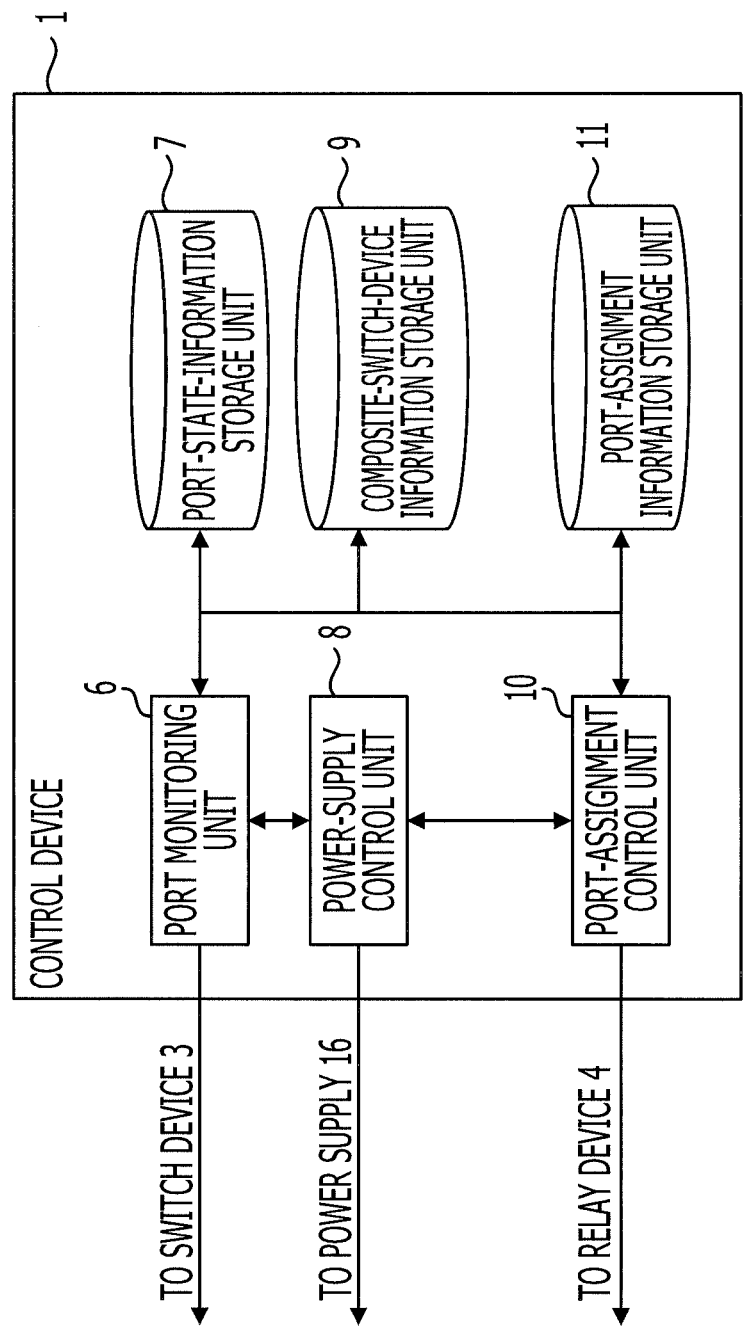
FIG. 3 is a diagram illustrating one example of a configuration of a control device illustrated in FIG. 1.

The control device 1 illustrated in FIG. 3 includes a port monitoring unit 6, a port-state-information storage unit 7, a power-supply control unit 8, a composite-switch-device information storage unit 9, a port-assignment control unit 10, and a port-assignment information storage unit 11.

The port monitoring unit 6 monitors the usage states of the switch-side ports of each SW 3. The port monitoring unit 6 according to an embodiment is coupled to the SWs 3 via the R 4 to monitor whether or not the switch-side ports "0" to "3" of the SWs 3 are in operation or in idle states and also to collect information (i.e., port-state information) regarding the states of the switch-side ports "0" to "3". When input/output of data at the switch-side port is not detected for a predetermined period of time, the port monitoring unit 6 can determine that the switch-side port is in the idle state. When input/output of data at the switch-side port is detected in a predetermined period of time, the port monitoring unit 6 can determine that the switch-side port is in operation. The port monitoring unit 6 may perform the monitoring periodically, irregularly, or constantly.

Monitor results collected by the port monitoring unit 6 are stored in the port-state-information storage unit 7 as the port-state information.

The port monitoring unit 6 may further obtain, via management interfaces provided in the SWs 3, the states of the switch-side ports of the SWs 3 and a destination-information table of the SWs 3. The destination-information table refers to a table containing, for example, a relationship between destination information set for input data and the switch-side ports corresponding thereto. While a particular example is provided with respect to the destination-information table, the present invention is not limited to any particular content in relation to the destination-information table and may include any activity, condition, or element relative to a port.

With this arrangement, the port monitoring unit 6 can obtain, for example, information regarding equipment coupled to the SWs 3 and information regarding the startup states and so on of devices coupled via the SWs 3 and the Rs 4.

The port-state-information storage unit 7 stores the port-state information collected by the port monitoring unit 6. Examples of the port-state information include, for each of the switch-side ports "0" to "3" of the SW 3, a port status, information indicating whether or not the port is to be monitored by the port monitoring unit 6, information indicating whether or the port is in operation, and destination information of a device coupled to the port. As described above, the destination information may be a MAC address, an IP address, terminal identification information, or the like.

On the basis of the port-state information, the port-assignment control unit 10 controls switching of connections between the second ports and the first ports of the R 4. For example, the port-assignment control unit 10 may send a predetermined control message to the connection switching portion 12 so that the connection switching portion 12 executes the switching control.

The port-assignment control unit 10 is coupled to the R 4 to collect, as composite-switch-device information, a relationship of connections between the first ports "A0" to "A6" of the R 4 and the switch-side ports "0" to "3" and a relationship of connections between the second ports "B0" to "B6" and the corresponding devices. The composite-switch-device information collected by the port-assignment control unit 10 is stored in the composite-switch-device information storage unit 9.

The port-assignment control unit 10 may collect the composite-switch-device information from each R 4 or a system administrator or the like may set and store the composite-switch-device information.

In addition, the port-assignment control unit 10 collects, from the R 4, the relationship of connections between the first ports "A0" to "A6" and the second ports "B0" to "B6" of the R 4 as port-assignment information. The port-assignment information collected by the port-assignment control unit 10 is stored in the port-assignment information storage unit 11.

The port-assignment information contains, for each R 4, the relationship of connections between the second ports "B0" to "B6" and the first ports "A0" to "A6" and information indicating whether or not the connection relationship can be changed. The port-assignment control unit 10 may collect the port-assignment information from each R 4 or a system administrator or the like may set the port-assignment information.

With this arrangement, on the basis of the result of the monitoring performed by the port monitoring unit 6, the port-assignment control unit 10 can perform control for switching the connections between the second ports "B0" to "B6" and the first ports "A0" to "A6" of the R 4 so that the ports included in the second ports "B0" to "B6" and coupled via any of the first ports to the ports that are included in the switch-side ports "0" to "3" of the SWs 3 and that are in use are collectively coupled to at least one of the SWs 3.

The power-supply control unit 8 serves as a power control unit and controls supply of power to the SWs 3.

For example, when the port-assignment control unit 10 performs the switching control, the power-supply control unit 8 receives information regarding a port assignment change from the port-assignment control unit 10, and stops the supply of the power to the SW 3 in which all of the switch-side ports were put into the non-used states, on the basis of the received information. To stop the power supply, for example, the power-supply control unit 8 may control the power supply 16 or may send, to the SW 3, a command for turning off the power.

That is, the power-supply control unit 8 stops the supply of the power to the SW 3 in which all of the switch-side ports "0" to "3" were put into the non-used states by the switching control of the port-assignment control unit 10. The SW 3 to which the power is stopped from being supplied is the SW 3 other than the SW 3 to which the ports that are being used as a result of the switching control of the port-assignment control unit 10 are collectively coupled.

In an embodiment, for example, the control device 1 monitors the usage states of the switch-side ports of each SW 3.

On the basis of the result of the monitoring, the control device 1 performs control for switching the connections between the second ports and the first ports of the R 4 so that the ports included in the second ports and coupled to the ports that are included in the switch-side ports of the SWs 3 and that are in use are collectively coupled to at least one of the SWs 3.

In other words, on the basis of the usage states of the switch-side ports of the SWs 3, the control device 1 dynamically changes the connections in the R 4 to the SWs 3, so that the switch-side ports that are in use are collectively coupled to a smallest possible number of SWs 3.

In addition, the control device 1 stops the supply of the power to the SW 3 in which all of the switch-side ports were put into the non-used states, thereby making it possible to significantly reduce the amount of power consumed by the control system 20.

That is, in an embodiment, since it is possible to reduce the total amount of power consumed by the SW 3 in which all of the switch-side ports are put into the non-used states, the amount of power consumed by the control system 20 can be significantly reduced even when the amount of power consumed by the switch-side ports of the SWs 3 and the communication processing units 15 are not sufficiently small relative to the total amount of power consumed by the SWs 3.

The R 4 may be implemented by, for example, a latching relay circuit that consumes power during switching of the connections. With the latching relay circuit, the amount of power consumed by the R 4 is small compared to the amount of power consumed by the SWs 3. Thus, even when the amount of power consumed by the R 4 is taken into account, the amount of power consumed by the entire system is significantly reduced.

Example of Operation of Control System is Set Forth Below in Detail.

An example of the operation of the control system will be described next. Although a control system 30 will be described below as one example of the control system 20 described above, it goes without saying that the configuration is applicable to not only the specific control system 20 but also, for example, a control system having a configuration in which at least one composite switch device 2 and the control device 1 are coupled to each other.

Example of Configuration of Control System is Described Below in Detail.

Figure 4:
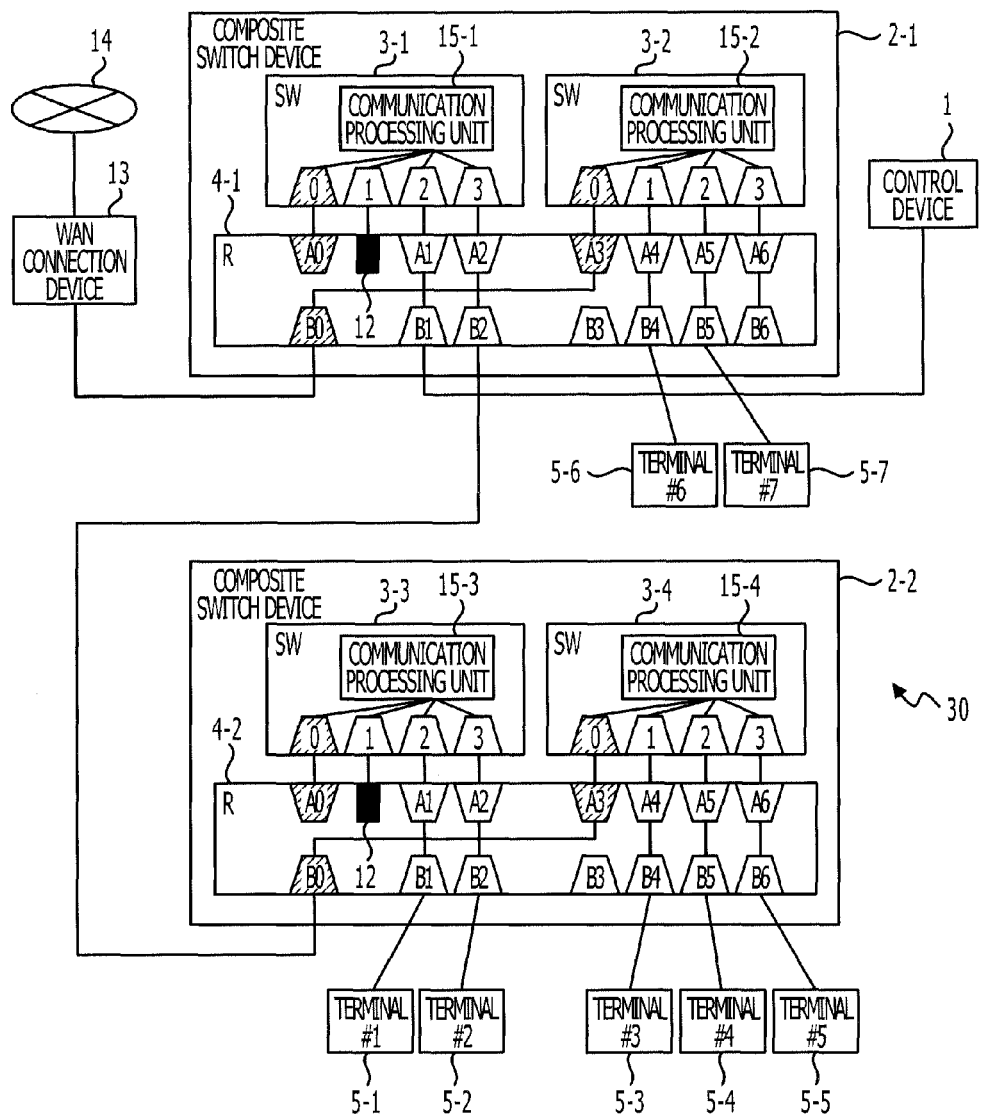
FIG. 4 is a diagram illustrating an example of a network including a control system according to an embodiment.

FIG. 4 is a diagram illustrating one example of the configuration of a network including the control system 30 according to one embodiment.

The network illustrated in FIG. 4 includes the control system 30, terminals 5-1 to 5-7 (5-1, 5-2, 5-3, 5-4, 5-5, 5-6 and 5-7), a WAN connection device 13, and a WAN 14. The control system 30 has a control device 1 and composite switch devices 2-1 and 2-2. The control system 30 illustrated in FIG. 4 is coupled to the WAN 14 via the WAN connection device 13.

As described above with reference to FIG. 2, each composite switch device 2 has SWs 3 and a R 4. That is, as described above with reference to FIG. 3, the control device 1 includes a port monitoring unit 6, a port-state-information storage unit 7, a power-supply control unit 8, a composite-switch-device information storage unit 9, a port-assignment control unit 10, and a port-assignment information storage unit 11. The SWs 3, the Rs 4, the port monitoring unit 6, the port-state-information storage unit 7, the power-supply control unit 8, the composite-switch-device information storage unit 9, the port-assignment control unit 10, the port-assignment information storage unit 11, and the terminals 5-1 to 5-7 have substantially the same configurations as those described above. Each SW 3 can receive power supplied from a power supply 16 (not illustrated in FIG. 4).

The WAN 14 is a wide area network, such as an ISP (internet service provider) network or the Internet.

The WAN connection device 13 serves as network equipment that provides connection between the control system 30 and the WAN 14 to relay data therebetween. The WAN connection device 13 includes, for example, a router, a gateway device, a bridge, and a server.

In the example illustrated in FIG. 4, the control device 1, the composite switch device 2-2, and the WAN connection device 13 are intercoupled via the composite switch device 2-1. The terminals 5-1 to 5-5 are coupled to the composite switch device 2-2 and the terminals 5-6 and 5-7 are coupled to the composite switch device 2-1.

In addition, in the composite switch device 2-1, the switch-side ports "0", "1", "2", and "3" of the SW 3-1 are coupled with the port "A0", the connection switching portion 12, the port "A1", and the port "A2", respectively, of the R 4-1.

The switch-side ports "0", "1", "2", and "3" of the SW 3-2 are also coupled with the ports "A3", "A4", "A5", and "A6", respectively, of the R 4-1.

In the R 4-1, the ports "A1", "A2", "A4", "A5", and "A6" are coupled with the ports "B1", "B2", "B4", "B5", and "B6", respectively, and the ports "A0" and "A3" are coupled with the port "B0".

The ports "B0", "B1", "B2", "B4", and "B5" of the R 4-1 are coupled to the WAN connection device 13, the control device 1, the composite switch device 2-2, the terminal 5-6, and the terminal 5-7, respectively. In the example illustrated in FIG. 4, the second ports "B3" and "B6" of the R 4-1 are not coupled to the terminals 5 or the like and thus are in non-used states, i.e., in states in which no data is input/output.

On the other hand, in the composite switch device 2-2, the switch-side ports "0", "1", "2", and "3" of the SW 3-3 are coupled with the port "A0", the connection switching portion 12, the port "A1", and the port "A2", respectively, of the R 4-2.

The switch-side ports "0", "1", "2", and "3" of the SW 3-4 are also coupled with the ports "A3", "A4", "A5", and "A6", respectively, of the R 4-2.

In addition, in the R 4-2, the ports "A1", "A2", "A4", "A5", and "A6" are coupled with the ports "B1", "B2", "B4", "B5", and "B6", respectively, and the ports "A0" and "A3" are coupled with the port "B0".

The ports "B0", "B1", "B2", "B4", "B5", and "B6" of the R 4-2 are coupled to the composite switch device 2-1, the terminal 5-1, the terminal 5-2, the terminal 5-3, the terminal 5-4, and the terminal 5-5, respectively. In the example illustrated in FIG. 4, the second port "B3" of the R 4-2 is not coupled to the terminals 5 or the like and thus is in a non-used state, i.e., in a state in which no data is input/output.

Example of Initial State of Control System 30 is Described in Detail Below.

A case in which all of the terminals 5 are in operation will first be described as one example of the initial state of the control system 30. In such an initial state, the port monitoring unit 6 collects port-state information illustrated in FIG. 5.

As illustrated in FIG. 5, the port-state information contains, for example, information "status", "monitor target (○/x)", "operated/idle ((○/x)", "destination information", and so on for each switch-side port of the SW 3. While particular port-state information is illustrated in FIG. 5, the present invention is not limited to any type of information and may include any data pertaining to the switch-side port of the SW3.

The information "status" indicates the state of the switch-side port. Examples of information set in each field "status" include "coupled with another device" indicating that the switch-side port of the SW 3 is coupled with another composite switch device 2, the WAN connection device 13, or the like, "for control" indicating whether or not the switch-side port is being coupled to the connection switching portion 12, "normal" indicating that the switch-side port is being coupled to the terminal 5, the control device 1, or the like, and "not coupled" indicating that the switch-side port is not coupled to any device and thus is not in use.

The "monitor target" indicates whether or not the switch-side port is a target to be monitored by the port monitoring unit 6. Examples of information set in each field "monitor target" include "○" indicating that the switch-side port of the SW 3 is to be monitored by the port monitoring unit 6 and "x" indicating that the switch-side port of the SW 3 is not to be monitored by the port monitoring unit 6.

For example, the switch-side port whose "status" is any of the "coupled with another device", "for control", and "not coupled" may be excluded from the port-connection change target. In this case, since the switch-side port does not need to be monitored by the port monitoring unit 6, "x" may be set in the field "monitor target" of the switch-side port.

In this case, since the switch-side port whose "status" is "normal" is to be monitored by the port monitoring unit 6, "○" is set in the field "monitor target" of the switch-side port.

The information "operated/idle" indicates the usage state of the switch-side port. Examples of information set in each field "operated/idle" include "○" indicating that data is input/output to/from the switch-side port of the SW 3 and "x" indicating that no data is input/output to/from the switch-side port of the SW 3. The presence/absence of input/output of data may be determined based on whether or not the port monitoring unit 6 detects input/output of data in a predetermined period of time.

In this case, since the switch-side port whose "status" is "not coupled" is not in use, "x" is set in the field "operated/idle" of the switch-side port.

The "destination information" indicates a destination to which the switch-side port of the SW 3 is coupled via the R 4. For example, in the field "destination information", a MAC address, an IP address, identification information, or the like of a device coupled to the switch-side port of the SW 3 is set.

In the initial state of the control system 30, the port-assignment control unit 10 collects composite-switch-device information illustrated in FIGS. 6 and 7. FIG. 6 illustrates one example of the composite-switch-device information for the R 4-1 and FIG. 7 illustrates one example of the composite-switch-device information for the R 4-2.

The composite-switch-device information illustrated in FIG. 6 indicates that the ports "A0", "A1", and "A2" of the R 4-1 and the switch-side ports "0", "2", and "3" of the SW 3-1 are coupled to each other and the ports "A3" to "A6" of the R 4-1 and the switch-side ports "0" to "3" of the SW 3-2 are coupled to each other.

The composite-switch-device information illustrated in FIG. 6 indicates that the ports "B0", "B1", "B2", "B4", and "B5" of the R 4-1 are coupled to the WAN connection device 13, the control device 1, the composite switch device 2-2, the terminal 5-6, and the terminal 5-7, respectively.

The composite-switch-device information illustrated in FIG. 7 indicates that the ports "A0", "A1", and "A2" of the R 4-2 and the switch-side ports "0", "2", and "3" of the SW 3-3 are coupled to each other and the ports "A3" to "A6" of the R 4-2 and the switch-side ports "0" to "3" of the SW 3-4 are coupled to each other.

The composite-switch-device information illustrated in FIG. 7 further indicates that the ports "B0", "B1", "B2", "B4", "B5, and "B6" of the R 4-2 are coupled to the composite switch device 2-1, the terminal 5-1, the terminal 5-2, the terminal 5-3, the terminal 5-4, and the terminal 5-5, respectively.

In addition, in the initial state of the control system 30, the port-assignment control unit 10 collects port-assignment information illustrated in FIGS. 8 and 9. FIG. 8 illustrates one example of the port-assignment information for the R 4-1 and FIG. 9 illustrates one example of the port-assignment information for the R 4-2.

The port-assignment information illustrated in FIG. 8 contains information regarding the relationship of connections between the first ports and the second ports of the R 4-1 and information indicating whether or not the relationship of connections can be changed. The port-assignment information illustrated in FIG. 9 also contains information regarding the relationship of connections between the first ports and the second ports of the R 4-2 and information indicating whether or not the relationship of connections can be changed.

For example, when the relationship of connections between the switch-side ports whose "status" is "coupled with another device" and the ports "B0", "A0", and "A3" is changed, there are cases in which communication between the devices cannot be performed. Thus, with respect to the ports "B0", "A0", and "A3", "x" indicating prohibition of a change in the connection relationship may be set in the field "changeability".

For example, with respect to a connection relationship including the first ports "B1" to "B6" coupled with the switch-side ports whose "status" is not "coupled to another device", "○" indicating permission of a change in the connection relationship may be set in the field "changeability".

Port Assignment Change Processing According to an Embodiment is Set Forth Below in Detail.

A case in which the terminals 5-1 to 5-4 in the control system 30 are put into the idle states will be described next with reference to FIG. 10. The idle state refers to, for example, a state in which the power supply of the terminal 5 is turned off or a state in which the terminal 5 is not operated for a certain period of time.

When the terminals 5-1 to 5-4 are put into the idle states, no data is input/output to/from the switch-side ports "2" and "3" of the SW 3-3 which are coupled to the terminals 5-1 and 5-2 via the R 4-2 and the switch-side ports "1" and "2" of the SW 3-4 which are coupled to the terminals 5-3 and 5-4 via the R 4-2.

The port monitoring unit 6 determines that, for example, the switch-side ports to/from which no data is input/output for a certain period of time are in the idle states. That is, in the example illustrated in FIG. 10, the port monitoring unit 6 determines that the switch-side ports "2" and "3" of the SW 3-3, the switch-side ports "1" and "2" of the SW 3-4 are in the idle states and reports the determination result to the port-assignment control unit 10.

Consequently, the port monitoring unit 6 and the port-assignment control unit 10 update the port-state information from the example illustrated in FIG. 5 to the example illustrated in FIG. 11.

In the example illustrated in FIG. 11, the fields "operated/idle" of the switch-side ports "2" and "3" of the SW 3-3 are changed to "x" and the fields "operated/idle" of the switch-side ports "1" and "2" of the SW 3-4 are changed to "x".

The field "destination information" of the switch-side port "3" of the SW 3-1 is changed from "SW 3-3, SW 3-4, R 4-2, terminal 5-1, terminal 5-2, terminal 5-3, terminal 5-4, terminal 5-5" to "SW 3-3, SW 3-4, R 4-2, terminal 5-5".

In addition, the field "destination information" of the switch-side port "0" of the SW 3-3 is changed from "WAN connection device 13, SW 3-1, SW 3-2, R 4-1, control device 1, terminal 5-6, terminal 5-7, terminal 5-3, terminal 5-4, terminal 5-5" to "WAN connection device 13, SW 3-1, SW 3-2, R 4-1, control device 1, terminal 5-6, terminal 5-7, terminal 5-5".

In addition, the field "destination information" of the switch-side port "0" of the SW 3-4 is changed from "WAN connection device 13, SW 3-1, SW 3-2, R 4-1, control device 1, terminal 5-6, terminal 5-7, terminal 5-1, terminal 5-2" to "WAN connection device 13, SW 3-1, SW 3-2, R 4-1, control device 1, terminal 5-6, terminal 5-7".

Figure 12:
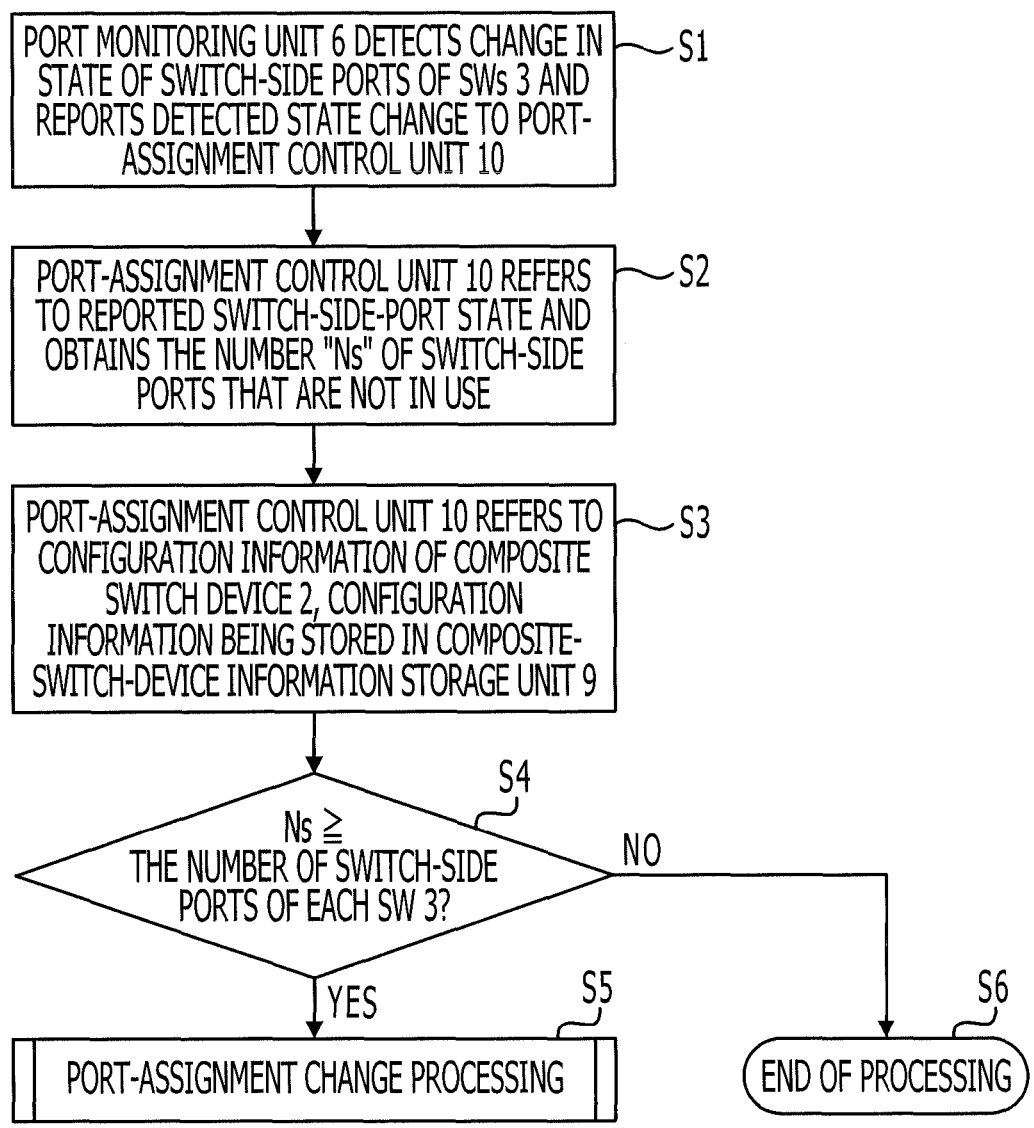
FIG. 12 is a flowchart illustrating one example of port-assignment change processing.

Next, the port-assignment control unit 10 performs port-assignment change processing on the R 4-2 in accordance with, for example, the flowchart illustrated in FIG. 12.

As illustrated in FIG. 12, first, in operation S1, the port monitoring unit 6 detects a change in the state of the switch-side ports of the SWs 3 and reports the detected state change to the port-assignment control unit 10. For example, when the terminals 5-1 to 5-4 are put into the idle states, the port monitoring unit 6 determines that the switch-side ports "2" and "3" of the SW 3-3 and the switch-side ports "1" and "2" of the SW 3-4 are in the idle states and reports the determination result to the port-assignment control unit 10. The reporting may be performed using the updated port-state information, as described above.

Next, in operation S2, the port-assignment control unit 10 refers to the switch-side-port state reported from the port monitoring unit 6 and obtains, for each composite switch device 2, the number "Ns" of switch-side ports that are not in use (where Ns is an integer greater than or equal to 0). In the above-described example, the port-assignment control unit 10 obtains "4" (=the number "Ns" for the composite switch devices 2-2) on the basis of the fields "operated/idle" of the SWs 3-3 and 3-4, the fields being contained in the port-state information illustrated in FIG. 11.

In operation S3, the port-assignment control unit 10 refers to the configuration information of the composite switch device 2, the configuration information being stored in the composite-switch-device information storage unit 9. By doing so, the port-assignment control unit 10 can obtain the number of switch-side ports for each SW 3. In the example described above, the port-assignment control unit 10 obtains "4" (=the number of switch-side ports of each SW 3) on the basis of the composite-switch-device information illustrated in FIG. 13. The processing in operation S3 may be performed prior to the processing in operations S1 and S2.

In operation S4, the port-assignment control unit 10 compares, for each SW 3, Ns obtained in operation S2 with the number of switch-side ports which is obtained operation S3.

When the result of the comparison indicates that Ns is greater than or equal to the number of switch-side ports of each SW 3 (i.e., Yes in operation S4), the process proceeds to operation S5 in which the port-assignment control unit 10 executes port-assignment change processing described below.

That is, when Ns≥"the number of switch-side ports of each SW 3" is satisfied, the ports other than the ports (the hatched portions in FIG. 10) coupled with another SW 3 may be put into non-used states, i.e., it may be determined that the SW 3 that can be powered off is present.

The determination condition used in operation S4 may be changed as needed. For example, in a case in which the numbers of switch-side ports of the SWs 3 are different from each other, the port-assignment control unit 10 may perform the port-assignment change processing when Ns is greater than or equal to the number of switch-side ports of any of the SWs 3.

In such a case, since port-assignment change processing for changing the connections of the ports of at least one SW 3 to another SW 3 can be performed, the power-supply control unit 8 can stop the supply of the power to at least one of the SWs 3.

The above-described determination condition is merely one example, and any other condition may also be used, for example, as long as connections to the switch-side ports that were put into the non-used states can be collectively coupled to at least one of the SWs 3.

When the result of the comparison indicates that Ns is smaller than the number of switch-side ports of each SW 3 (i.e., No in operation S4), the process proceeds to operation S6 in which the port-assignment control unit 10 does not execute the port-assignment change processing.

Figure 10:
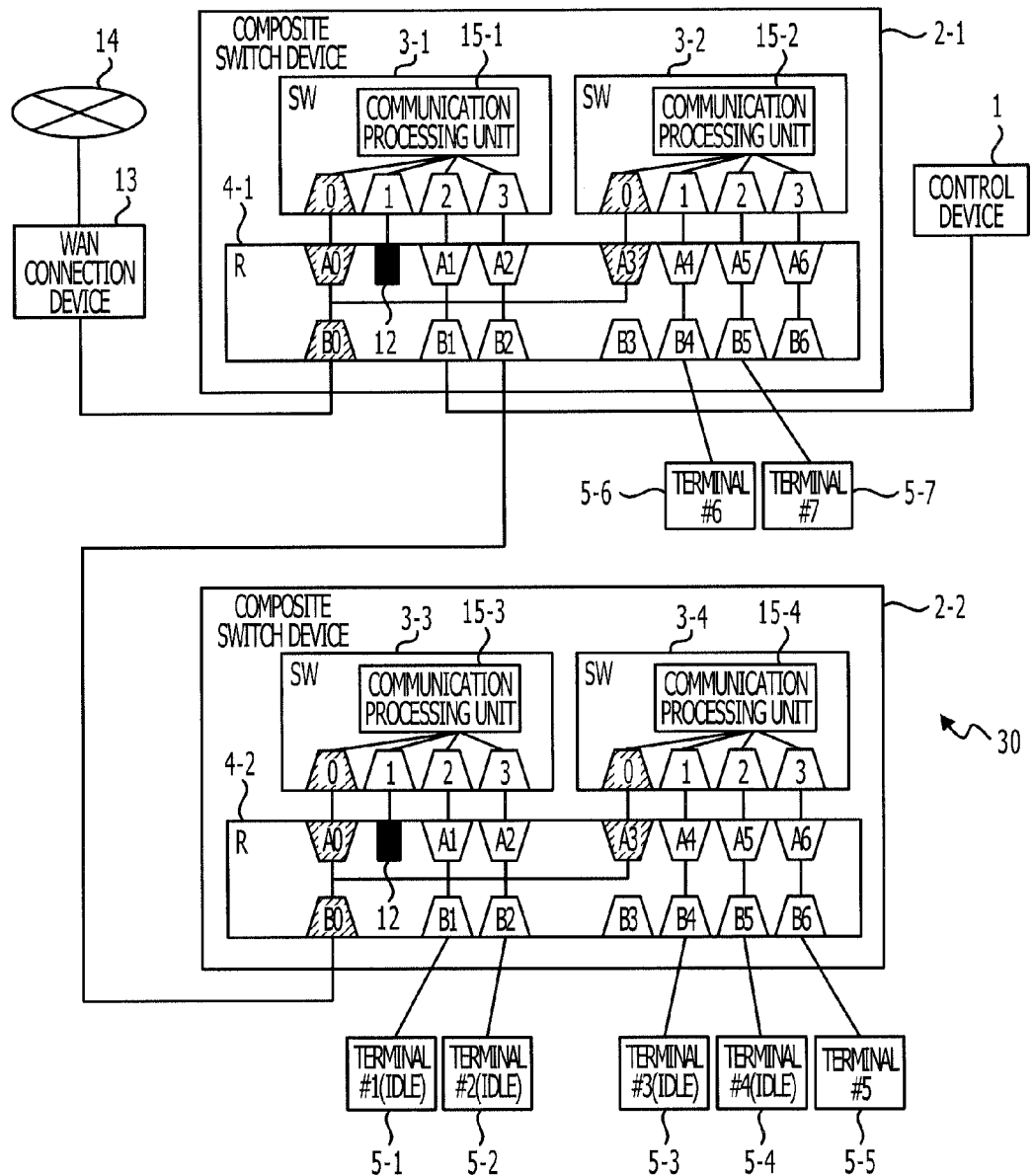
FIG. 10 is a diagram illustrating one example of a network including the control system according to an embodiment.

As illustrated in FIG. 10, when Ns for the composite switch device 2-2 is 4 and the number of switch-side ports of each SW 3 is 4, the port-assignment control unit 10 executes the port-assignment change processing.

A description will now be given of specific details of the port-assignment change processing.

First, on the basis of the port-state information and the composite-switch-device information of the composite switch device 2-2, the port-assignment control unit 10 obtains information regarding the switch-side port(s) that is not in use. The information may contain, for example, the number of the SW 3 to which the switch-side port(s) that is not in use belongs and the number(s) of the switch-side port(s).

Next, the port-assignment control unit 10 refers to the composite-switch-device information regarding the composite switch device 2-2 and obtains the port numbers (see the hatched portions in FIG. 13) of the ports included in the first ports and coupled to the switch-side ports that are not in use.

Then, on the basis of the composite-switch-device information illustrated in FIG. 13, the port-assignment control unit 10 refers to connection targets of the first ports "A0" to "A6" of the R 4-2 included in the composite switch device 2-2.

Subsequently, on the basis of the port-state information illustrated in FIG. 11, the port-assignment control unit 10 obtains the information in the fields "monitor target" and the fields "operated/idle" of the switch-side ports of the connection targets.

Further, on the basis of the composite-switch-device information illustrated in FIG. 13 and the port-state information illustrated in FIG. 11, the port-assignment control unit 10 obtains information regarding the fields "monitor target" and the fields "operated/idle" for the SWs 3 coupled to the first ports "A0" to "A6" of the R 4-2, as illustrated in FIG. 14.

In an embodiment, for example, the port-assignment control unit 10 detects that the first port included in the R 4-2 and coupled to, in the SW 3-3, the switch-side port that is to be monitored and that is in the idle state is the port "A1", on the basis of the table illustrated in FIG. 14, and also detects that the switch-side port included in the SW 3-3 and coupled to the first port "A1" of the R 4-2 is the port "2", on the basis of the composite-switch-device information illustrated in FIG. 13.

Also, for example, the port-assignment control unit 10 detects that the first port included in the R 4-2 and coupled to, in the SW 3-4, the switch-side port that is to be monitored and that is in operation is the port "A6", on the basis of the table illustrated in FIG. 14, and also detects that the switch-side port included in the SW 3-4 and coupled to the first port "A6" of the R 4-2 is the port "3", on the basis of the composite-switch-device information illustrated in FIG. 13.

The port-assignment control unit 10 then determines that changes are to be made to the connection target of the first port "A1" included in the R 4-2 and coupled to, in the SW 3-3, the switch-side port "2" that is to be monitored and that is in the idle state and the connection target of the first port "A6" included in the R 4-2 and coupled to, in the SW 3-4, the switch-side port "3" that is to be monitored and that is in operation. Prior to the changes, the port-assignment control unit 10 may check that the first ports "A1" and "A6" are ports whose connection targets can be changed.

Next, by referring to the port-assignment information for the R 4-2, the port-assignment control unit 10 interchanges between the port "A1" and the port "A6", as illustrated in FIG. 15, and changes the relationship of the connections in the R 4-2 to thereby perform the port-assignment change processing.

Figure 16:
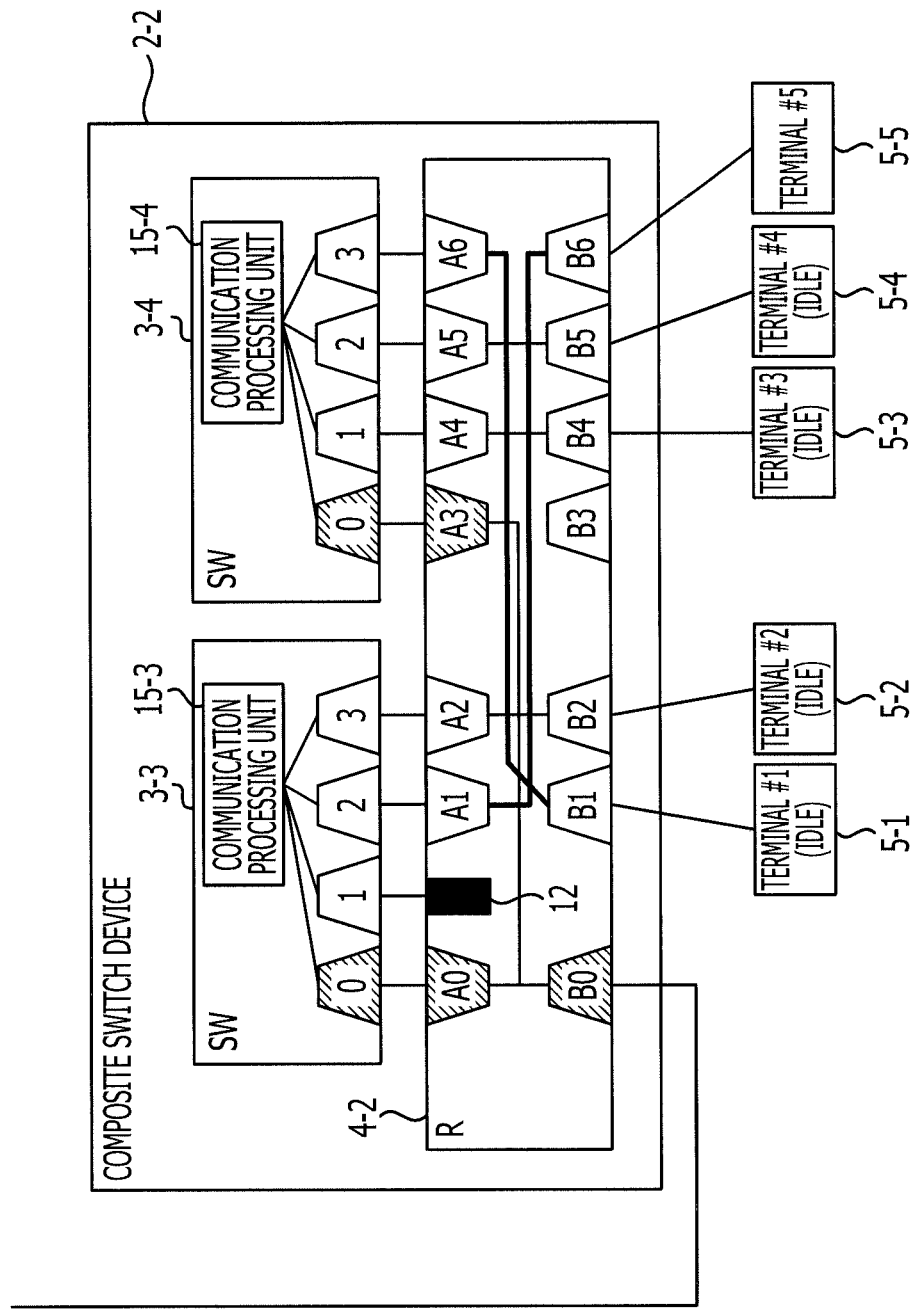
FIG. 16 is a flowchart illustrating one example of a state of connections after a port-assignment change processing.

Consequently, as illustrated in FIG. 16, the connection target of the port "A1" of the R 4-2 is changed to the port "B6" coupled to the terminal 5-5 in operation and the connection target of the port "A6" of the R 4-2 is changed to the port "B1" coupled to the terminal 5-1 in the idle state.

As described above, in an embodiment, the port-assignment control unit 10 controls switching of the connections between the second ports and the first ports of the R 4 so that the ports included in the second ports and coupled via any of the first ports to the ports that are included in the switch-side ports of the SWs 3 and that are in use are collectively coupled to at least one of the SWs 3.

Also, in an embodiment, the port-assignment control unit 10 controls switching of the connections between the second ports and the first ports of the R 4 so that the ports included in the second ports and coupled via any of the first ports to the ports that are included in the switch-side ports of the SWs 3 and that are not in use are collectively coupled to the SW 3 in which all of the switch-side ports were put into non-used states.

During the above-described port-assignment change processing, the port-assignment control unit 10 may delete the destination-information table, such as a MAC address table, included in the SWs 3. As described above, the destination-information table may be, for example, information regarding associations between the switch-side ports and the destination information set for data.

With this arrangement, since each SW 3 can recreate the associations between the switch-side ports and the destination information in accordance with the relationship of the port connections changed during the port-assignment change processing, it is possible to prevent misdelivery of data.

Stopping of Supply of Power to Switch Device 3 is Described Below in Detail.

Next, a description will be given of power-supply stopping processing performed by the power-supply control unit 8.

As a result of the port-assignment change processing described above, the port-state information is changed to information as illustrated in FIG. 17.

As a result, the port-assignment control unit 10 can extract information as illustrated in FIG. 18 from the updated port-state information. On the basis of the information illustrated in FIG. 18, the port-assignment control unit 10 determines that none of the switch-side ports of the SW 3-4 is in use and also determines that the supply of the power to the SW 3-4 can be stopped.

The port-assignment control unit 10 issues, to the power-supply control unit 8, an instruction for stopping the supply of the power to the SW 3-4. Upon receiving the instruction, the power-supply control unit 8 controls the power supply 16 to stop the supply of the power to the SW 3-4.

Figure 19:
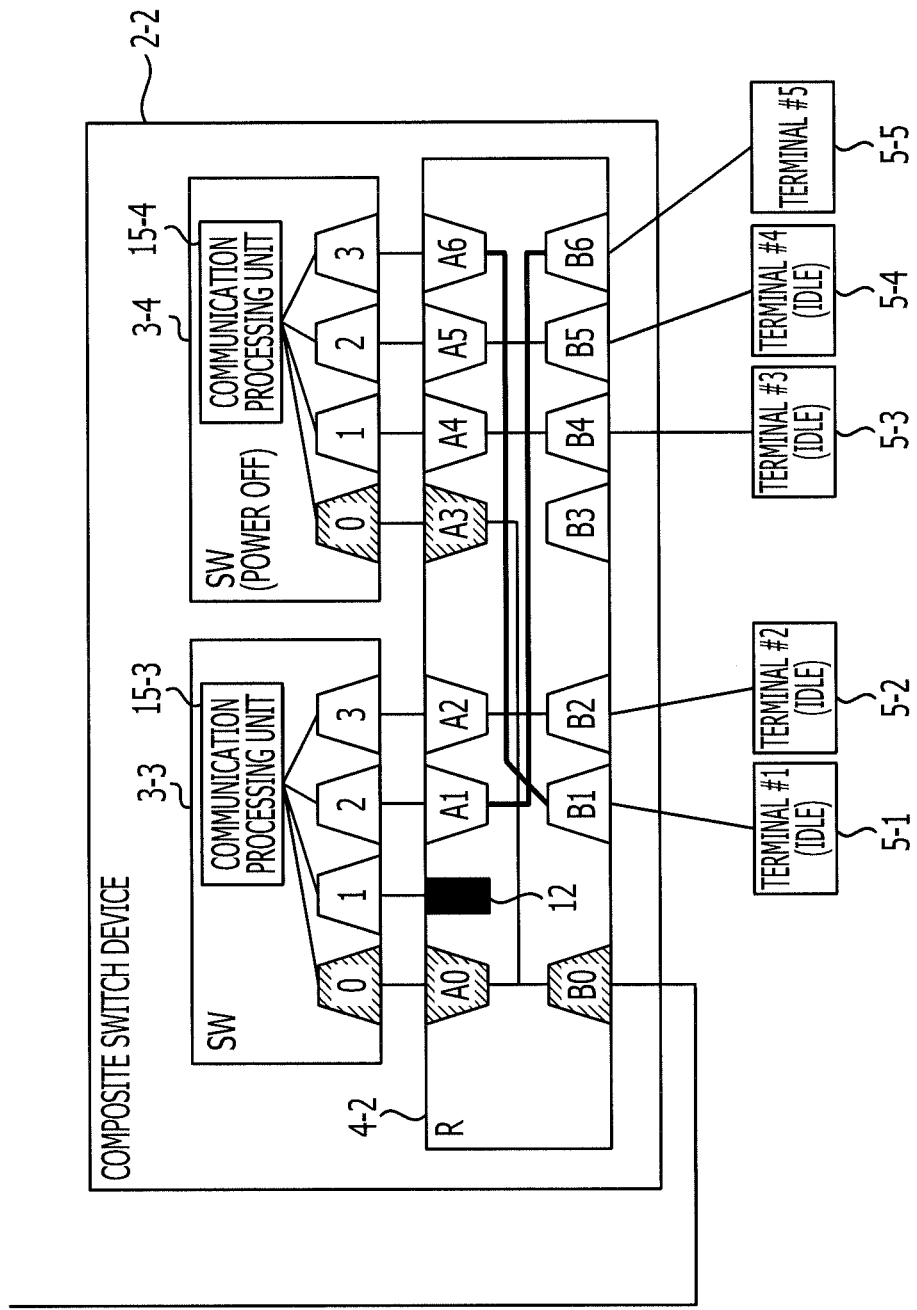
FIG. 19 illustrates one example of a state after stopping of power supply.

As a result, the port connection state of the composite switch device 2-2 becomes a state as illustrated in FIG. 19. Since the supply of the power to the SW 3-4 in which all of the switch-side ports are in the non-used states is stopped as illustrated in FIG. 19, the amount of power consumed can be significantly reduced.

Creation of Monitor Port is Described Below in Detail.

As a result of the processing described above, the state of the composite switch device 2-2 becomes a state as illustrated in FIG. 19. That is, the terminal 5-2 in the idle state is coupled to the switch-side port "3" of the SW 3-3 and the terminals 5-3, 5-4, and 5-1 in the idle states are respectively coupled to the switch-side ports "1", "2", and "3" of the SW 3-4.

In this case, when the terminals 5-1 to 5-4 in the idle states are operated again, switching control for changing the relationship of connections in the R 4-2 may be performed so that the terminals 5-1 to 5-4 can perform data communication.

Accordingly, in the present embodiment, a monitor port for monitoring whether or not the terminals 5-1 to 5-4 in the idle states are operated again is first created (set) in the SWs 3. The monitor port provided in the SWs 3 serves as a port for monitoring, upon connection to the second ports via the first ports, the presence/absence of data input/output.

Figure 20:
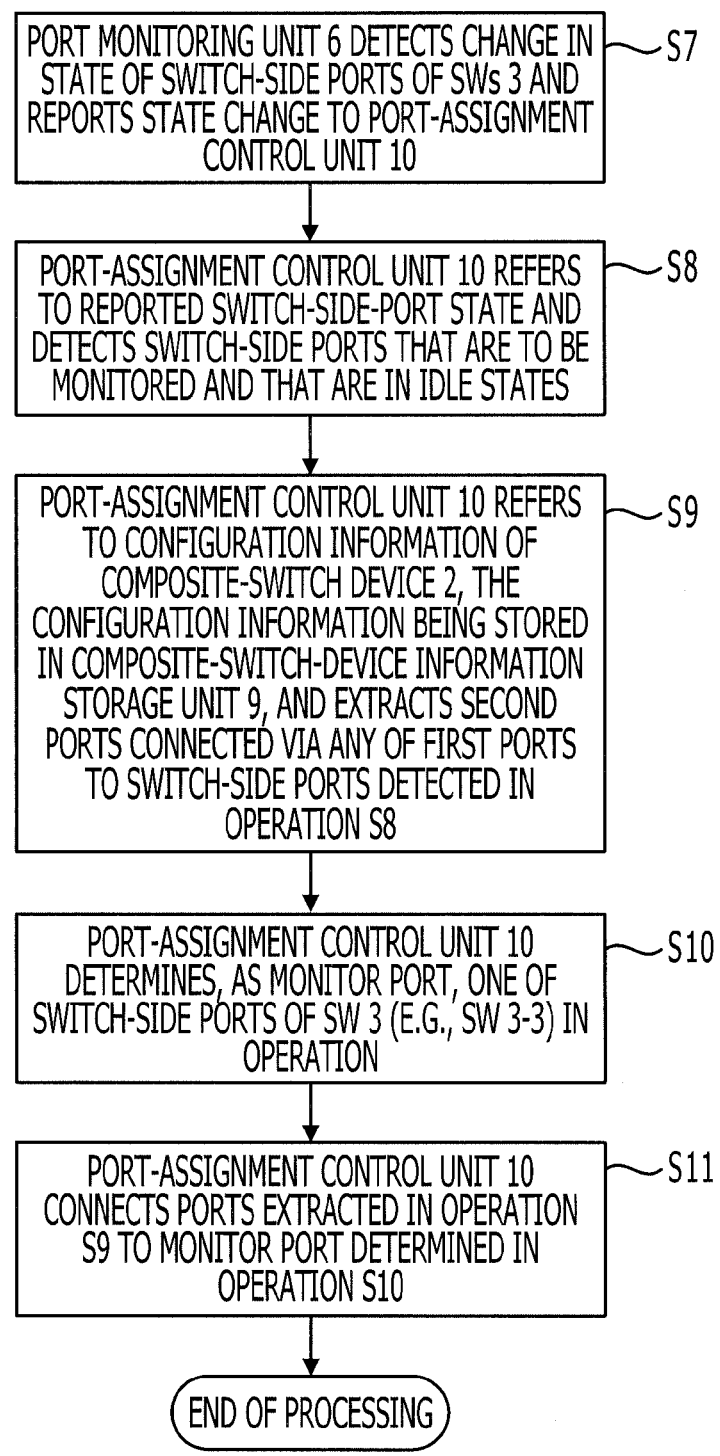
FIG. 20 is a flowchart illustrating one example of monitor-port creation processing.

FIG. 20 illustrates one example of processing for creating the monitor port.

First, in operation S7, the port monitoring unit 6 detects a change in the state of the switch-side ports of the SWs 3 and reports the state change to the port-assignment control unit 10. In the example described above, when the terminals 5-1 to 5-4 are put into the idle states, the port monitoring unit 6 determines that the switch-side ports "3" of the SW 3-3 and the switch-side ports "1" to "3" of the SW 3-4 are in the idle states and reports the resulting port-state information to the port-assignment control unit 10.

Next, in operation S8, the port-assignment control unit 10 refers to the port-state information reported from the port monitoring unit 6 and detects the switch-side ports that are to be monitored and that are in the idle states. In the example described above, the port-assignment control unit 10 detects the switch-side ports "3" of the SW 3-3 and the switch-side ports "1" to "3" of the SW 3-4, the ports being to be monitored and being in the idle states.

In operation S9, by referring to the configuration information of the composite-switch device 2, the configuration information being stored in the composite-switch-device information storage unit 9, the port-assignment control unit 10 extracts the second ports coupled via any of the first ports to the switch-side ports detected in operation S8. In the example described above, the port-assignment control unit 10 extracts the second ports "B1", "B2", "B4", and "B5" of the R 4-2.

Next, in operation S10, the port-assignment control unit 10 determines, as a monitor port, one of the switch-side ports of the SW 3 in operation. In the example described above, the port-assignment control unit 10 can determine the switch-side port "3" of the SW 3-3 in operation as the monitor port. The port "A2" included in the R 4-2 and coupled to the switch-side port "3" of the SW 3-3 in operation may be referred to as a "monitor port". In the present embodiment, although an example in which the switch-side ports of the SW 3 in operation serve as both the switch-side port and the monitor port is described, the SW 3 may have the monitor port independently from the switch-side ports.

In operation S11, the port-assignment control unit 10 couples to the ports of the R 4, the ports being coupled to the ports extracted in operation S9, to the monitor port determined in operation S10. In operation S12, the port-assignment control unit 10 ends the processing. In the example described above, the port-assignment control unit 10 couples to the second ports "B1", "B2", "B4", and "B5" of the R 4-2 to the monitor port.

Figure 21:
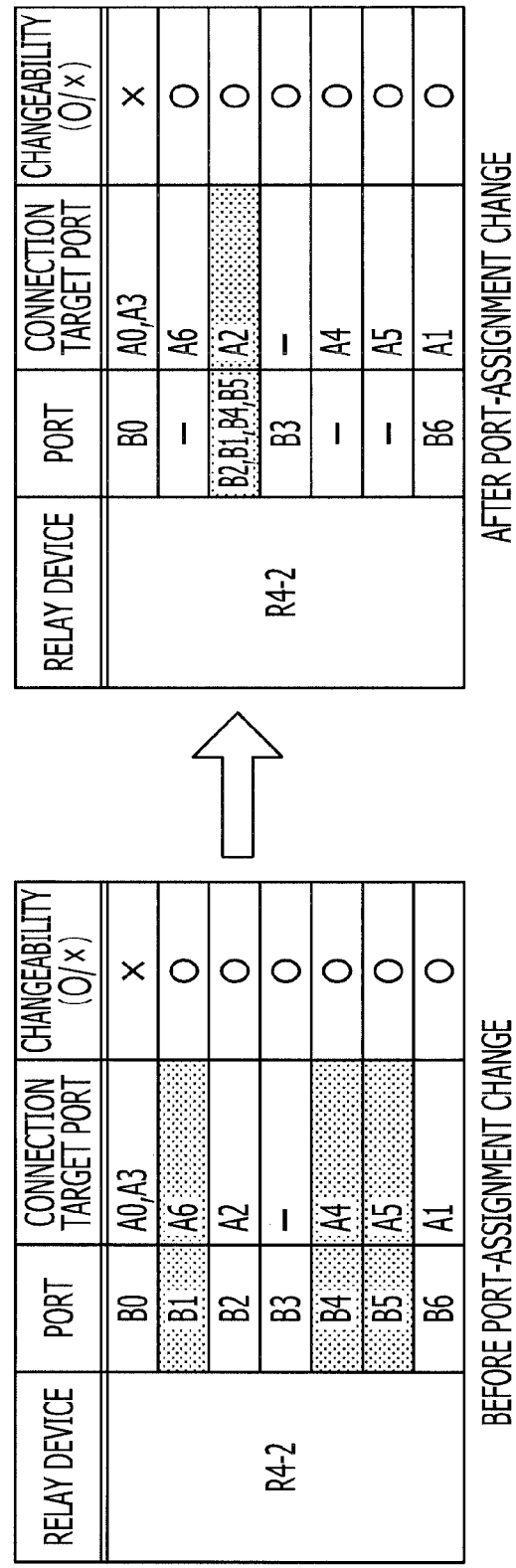
FIG. 21 illustrates another example of port-assignment information before and after a port-assignment change processing.

As a result of the processing described above, the state of the assignment of the ports of the R 4-2 is changed to a state as illustrated in FIG. 21.

Similarly, the port-assignment control unit 10 updates the port-state information to information as illustrated in FIG. 22. In the example illustrated in FIG. 22, "for monitor" is set in the field "status" of the switch-side port "3" of the SW 3-3. The "for monitor" indicates that the switch-side port is set as a monitor port.

Figure 23:
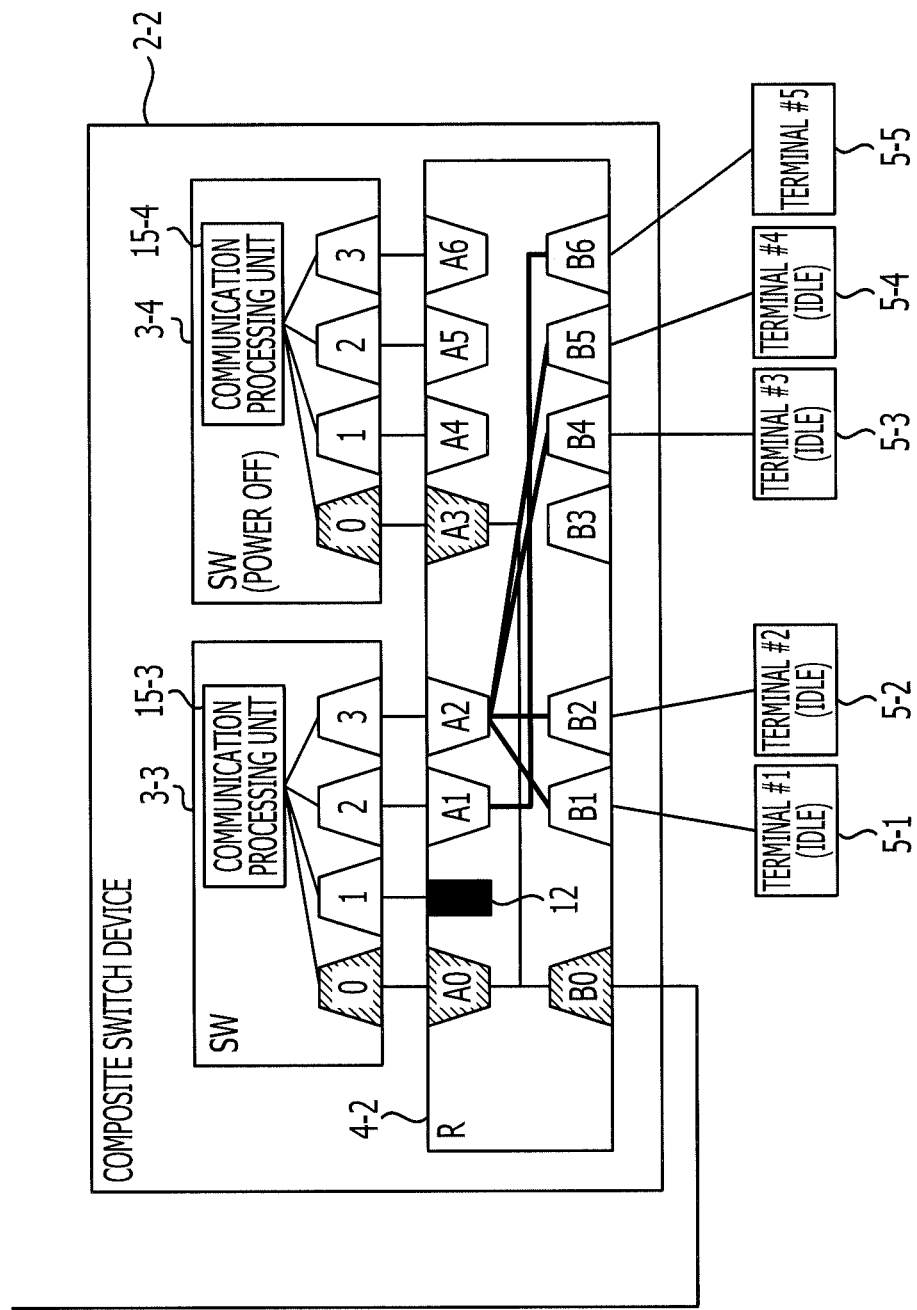
FIG. 23 is a flowchart illustrating one example of a state of connections after the processing illustrated in FIG. 20 is performed.

As a result of the change of the connections to the monitor port, the state of the connections of the ports of the composite switch device 2-2 becomes a state as illustrated in FIG. 23. As illustrated in FIG. 23, the terminals 5-1 to 5-4 in the idle states are coupled via the R 4-2 to the switch-side port "3" included in the SW 3-3 and serving as the monitor port.

Also, in the present embodiment, at least one of the SWs 3 has a monitor port for monitoring the presence/absence of input/output of data, and the port-assignment control unit 10 controls switching of the connections between the second ports and the first ports of the R 4 so that the ports included in the second ports and coupled via any of the first ports to the ports that are included in the switch-side ports of the SWs 3 and that are not in use are collectively coupled to the monitor port.

In this case, when any of the terminals 5-1 to 5-4 in the idle states is operated again, data is input from the operated one of the terminals 5-1 to 5-4 to the monitor port. The data input to the monitor port contains, for example, transmission-source information indicating the operated one of the terminals 5-1 to 5-4. Thus, on the basis of the data input to the monitor port, the port monitoring unit 6 can detect which of the terminals 5-1 to 5-4 is operated again.

With this arrangement, since the port monitoring unit 6 can detect which of the terminals 5-1 to 5-4 in the idle states is operated again by monitoring a change in the state of the monitor port, it is possible to simplify the monitoring processing.

An Example of a Processing when Terminal 5 in Idle State is Resumed is Described Below in Detail.

As described above, when the terminal 5 in the idle state is operated again, the data containing the transmission-source information of the terminal 5 is input to the monitor port that is being monitored by the port monitoring unit 6. Thus, the port monitoring unit 6 can identify the re-operated terminal 5.

In this case, the arrangement may also be such that the port monitoring unit 6 notifies the port-assignment control unit 10 about the presence of the re-operated terminal 5 and the notified port-assignment control unit 10 changes the state of the connections of the ports of the R 4 so as to allow the re-operated terminal 5 to perform data communication again by using the switch-side port other than the monitor-port.

Figure 24:
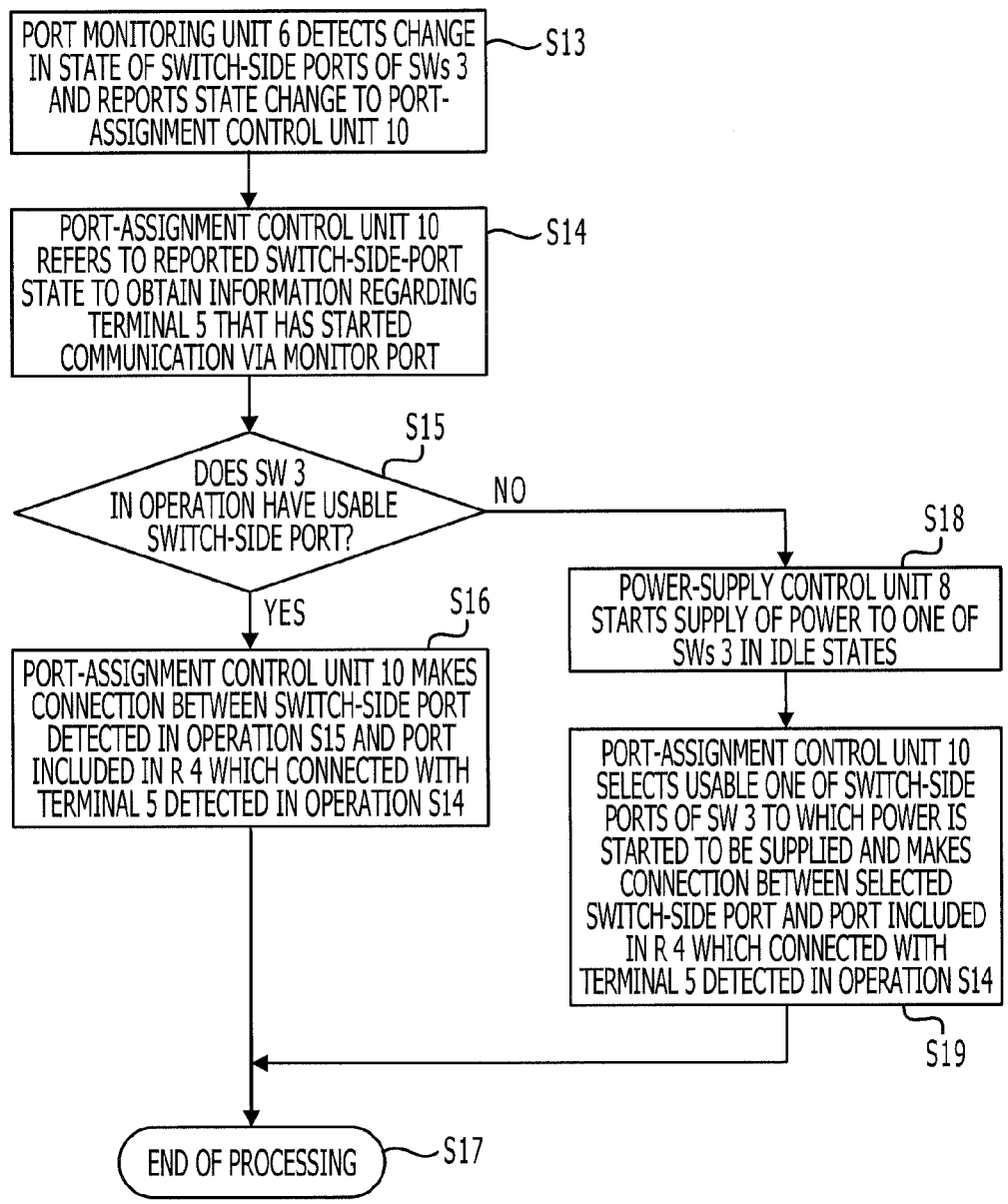
FIG. 24 is a flowchart illustrating one example of port-assignment change processing a terminal is re-operated.

FIG. 24 illustrates one example of a case in which the terminal 5 in the idle state is re-operated.

As illustrated in FIG. 24, first, in operation S13, the port monitoring unit 6 detects a change in the state of the switch-side ports of the SWs 3 and reports the state change to the port-assignment control unit 10. In the example described above, the port monitoring unit 6 detects input of data from the terminal 5-2 resumed from the idle state to the switch-side port "3" that is included in the SW 3-3 and that serves as the monitor port, and reports the switch-side-port state to the port-assignment control unit 10.

In operation S14, the port-assignment control unit 10 refers to the reported switch-side-port state to obtain the information regarding the terminal 5 that has started communication via the monitor port. In the example described above, the port-assignment control unit 10 detects that the re-operated terminal is the terminal 5-2, on the basis of the data input to the monitor port. As described above, the port-assignment control unit 10 may also detect that the re-operated terminal is the terminal 5-2, on the basis of the state reported from the port monitoring unit 6.

Next, in operation S15, the port-assignment control unit 10 determines whether or the SW 3 in operation has a usable switch-side port. The term "usable port" refers to, for example, the switch-side port whose "status" is "normal" or "not coupled" and whose "operated/idle" is "x" (i.e., in the idle state).

When it is determined that the SW 3 in operation has a usable switch-side port (Yes in operation S15), the process proceeds to operation S16 in which the port-assignment control unit 10 makes a connection between the switch-side port detected in operation S15 and the port included in R4 and coupled with the terminal 5 detected in operation S14. In operation S17, the processing ends.

That is, in the present embodiment, the port monitoring unit 6 monitors the usage state of the monitor port. When starting of the use of the port included in the second ports and coupled to the monitor port via any of the first ports is detected on the basis of the result of the monitoring, the port-assignment control unit 10 may perform control for switching the connections of the second ports and the first ports of the R 4 so that the port started to be used is coupled to any of the switch-side ports of the SW 3 in operation.

On the other hand, when it is determined that the SW 3 in operation has no usable switch-side port (i.e., No in operation S15), the process proceeds to operation S18 in which the port-assignment control unit 10 controls the power-supply control unit 8 to perform control for supplying power to one of the SWs 3 in the idle states. In the example described above, the power-supply control unit 8 starts supply of the power to the powered-off SW 3-4, to thereby turning on the power thereof.

That is, in the present embodiment, the arrangement may also be such that the port monitoring unit 6 monitors the usage state of the monitor port. When starting of the use of the port included in the second ports and coupled to the monitor port via any of the first ports is detected on the basis of the result of the monitoring, the power-supply control unit 8 starts the supply of the power to at least one of the SWs to which the power is stopped from being supplied and the port-assignment control unit 10 performs control for switching the connections of the second ports and the first ports of the R 4 so that the port started to be used is coupled to one of the switch-side ports of the at least one SW 3 to which the power is started to be supplied.

In the example described above, since the SW 3-3 in operation has no usable switch-side port, the supply of the power to the powered-off SW 3-4 is resumed.

Thereafter, in operation S19, the port-assignment control unit 10 selects a usable one of the switch-side ports of the SW 3 to which the power is started to be supplied and makes a connection between the selected switch-side port and the port included in the R 4 and coupled with the terminal 5 detected in operation S14. Thereafter, in operation S17, the processing ends. In the example described above, the port-assignment control unit 10 selects the switch-side port "A4" of the SW 3-4 to which the power is started (resumed) to be supplied and makes a connection between the switch-side port "A4" coupled to the SW 3-4 and the port "B2" coupled with the re-operated terminal 5-2.

As a result of the processing described above, the state of the assignment of the ports of the R 4-2 is changed to a state as illustrated in FIG. 25. As illustrated in FIG. 25, the port "B2" included in the R 4-2 and is coupled with the terminal 5-2 re-operated from the idle state is coupled to the port "A4" coupled to the switch-side port "1" of the SW 3-4 to which the power is resumed to be supplied.

Figure 26:
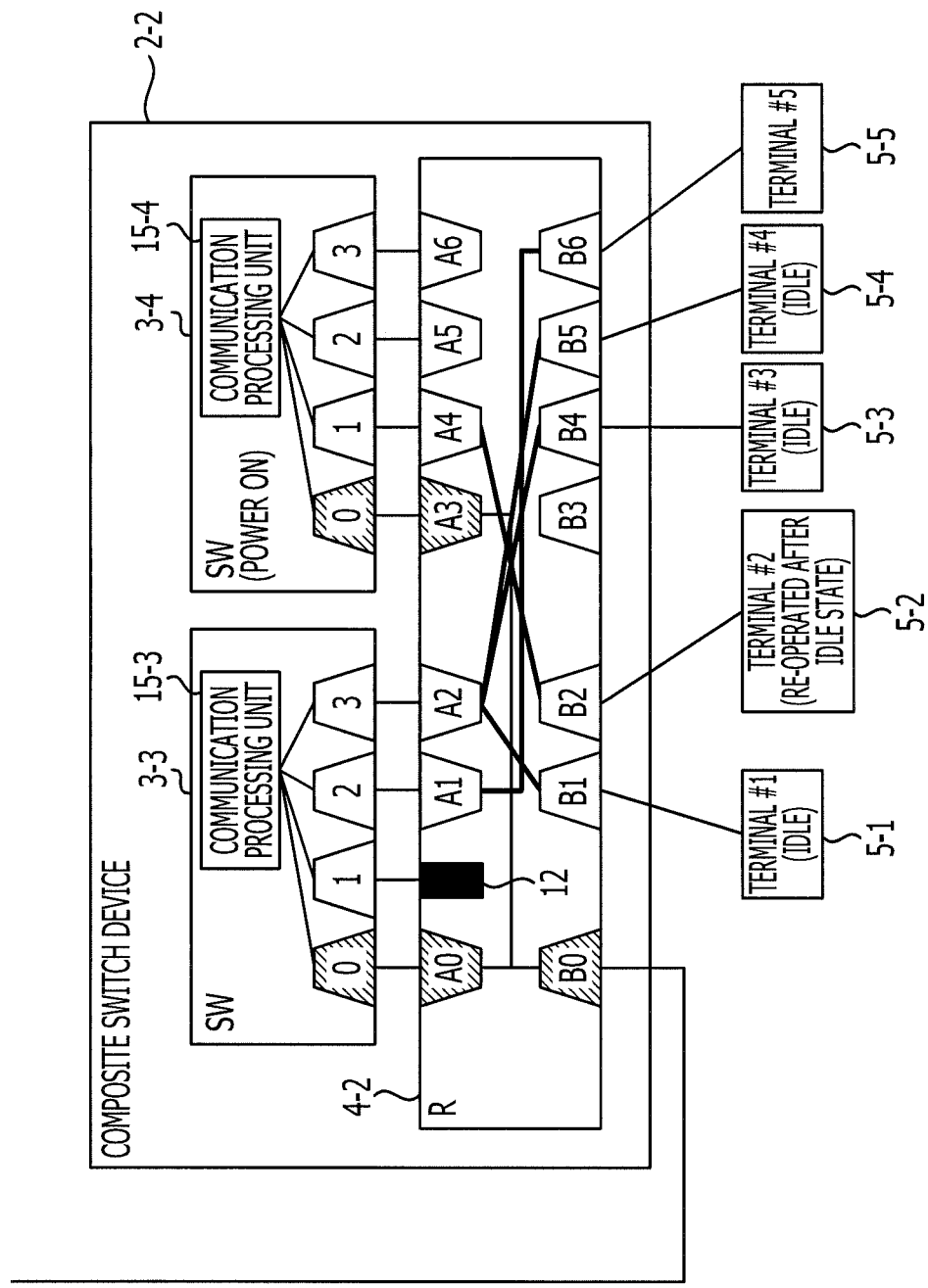
FIG. 26 is a diagram illustrating one example of a state of connections after the processing illustrated in FIG. 24 is performed.

As a result of the change of the connections of the ports, the state of the connections of the ports of the composite switch device 2-2 becomes a state as illustrated in FIG. 26.

As described above, when the terminal 5 resumes from the idle state, processing for supplying power to the SW 3 and processing for changing the connections of the ports of the R 4 can be flexibly performed. This makes it possible to perform control corresponding to various states.

The configurations and the processing operations of the above-described control device 1, the composite switch devices 2, the SWs 3, and the Rs 4 may be arbitrarily selected as needed or may be appropriately combined.

Although an example in which each composite switch device 2 has two SWs 3 has been described in the above examples, the present invention is also applicable to a case in which the composite switch device 2 has three or more SWs 3.

The present invention is also applicable to a case in which the numbers of switch-side ports included in the SWs 3 are different from each other.

In addition, in the example described above, when the terminal 5 in the idle state is re-operated and the SW 3 in operation has a usable switch-side port, the control for switching the connections in the R 4 is performed so that the re-operated terminal 5 is coupled to the usable switch-side port via the R 4. However, the arrangement may also be such that, even when the SW 3 in operation has a usable switch-side port, the supply of the power to the SW 3 in the idle state is started and control for switching the connections in the R 4 is performed so that the re-operated terminal 5 is coupled to the switch-side port of the SW 3 to which the power is started to be supplied.

With this arrangement, since an extra number of usable switch-side ports can be ensured, normal data communication can be ensured even when the multiple terminals 5 resume from the idle states. The port monitoring unit 6 can determine whether or not such control is to be performed, on the basis of whether or not the number of usable switch-side ports of the SW 3 in operation is smaller than or equal to a predetermined threshold.

According to an embodiment, a computer implemented control enables monitoring of switching of connections between ports including responsive to a dynamic change occurring to the connections and selectively controlling a power supply to switch devices based on the monitored connections. According to an embodiment, any connection between the ports may be re-assigned and thereby cause the power supply to be adjusted based on monitoring of the re-assignment.

Embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention, the scope of which is defined in the claims and their equivalents.

What is claimed is:

1. A control system, comprising:
   switch devices that operate on supplied power, each of the switch devices including multiple switch-side ports and a communication processing unit for relaying data input to any of the switch-side ports on a basis of destination information set for the data;
   a relay device that includes first ports coupled with corresponding switch-side ports of the switch devices and second ports selectively coupled with the first ports and that relay the data input to any of the second ports; and
   a control device that controls the switch devices and the relay device;
   wherein the control device includes:
       a port monitoring unit that monitors usage states of the switch-side ports of each of the switch devices;
       a port-assignment control unit that controls, on a basis of a result of the monitoring performed by the port-monitoring unit, switching of connections between the second ports and the first ports of the relay device so that ports included in the second ports and coupled via any of the first ports to the ports that are included in the switch-side ports of the switch devices and that are not in use are collectively coupled with at least one of the switch devices; and
       a power control unit that stops a supply of the power to the at least one of the switch devices in which all of the switch-side ports are put into non-used states by the switching control of the port-assignment control unit.

2. The control system according to claim 1, wherein the port-assignment control unit controls switching of the connections between the second ports and the first ports of the relay device so that the ports included in the second ports and coupled via any of the first ports to the ports that are included in the switch-side ports of the switch devices and that are in use are collectively coupled with the switch device other than the at least one of the switch devices.

3. The control system according to claim 1, wherein the switch device other than the at least one the switch devices has a monitor port for monitoring, upon connection with any of the second ports via any of the first ports, presence/absence of input/output of the data; and
   the port-assignment control unit controls switching of the connections between the second ports and the first ports of the relay device so that the ports included in the second ports and coupled via any of the first ports to the ports that are included in the switch-side ports of the switch devices and that are not in use are collectively coupled with the monitor port.

4. The control system according to claim 3, wherein the port monitoring unit monitors a usage state of the monitor port, and when starting of use of the port included in the second ports and coupled with the monitor port via any of the first ports is detected on a basis of a result of the monitoring, the port-assignment control unit controls switching of the connections between the second ports and the first ports of the relay device so that the port started to be used is coupled with any of the switch-side ports of the switch device other than the at least one of the switch devices.

5. The control system according to claim 3, wherein the port monitoring unit monitors a usage state of the monitor port, and when starting of use of the port included in the second ports and coupled with the monitor port via any of the first ports is detected on a basis of a result of the monitoring, the power control unit starts the supply of the power to the at least one of the switch devices to which the power is stopped from being supplied and the port-assignment control unit controls switching of the connections between the second ports and the first ports of the relay device so that the port started to be used is coupled with any of the switch-side ports of the at least one of the switch devices to which the power is started to be supplied.

6. The control system according to claim 1, wherein, during control of the switching of the connections between the second ports and the first ports of the relay device, the port-assignment control unit deletes information of the switch devices, and
   the information is regarding an association between the switch-side ports and the destination information.

7. A control device for controlling a composite switch device having switch devices and a relay device, the control device comprising:
   a port monitoring unit that monitors usage states of switch-side ports of each of the switch devices;
   a port-assignment control unit that controls, on a basis of a result of the monitoring performed by the port-monitoring unit, switching of connections between second ports and first ports of the relay device so that ports included in the second ports and coupled via any of the first ports to the ports that are included in the switch-side ports of the switch devices and that are not in use are collectively coupled with at least one of the switch devices; and
   a power control unit that stops a supply of the power to the at least one of the switch devices in which all of the switch-side ports are put into non-used states by the switching control of the port-assignment control unit, and
   wherein each of the switch devices includes multiple switch-side ports and a communication processing unit for relaying data input to any of the switch-side ports based on destination information set for the data and the first ports are coupled with corresponding switch-side ports of the switch devices and second ports are selectively coupled with the first ports and relays the data, input to any of the second ports, to any of the first ports.

8. The control device according to claim 7, wherein the port-assignment control unit controls switching of the connections between the second ports and the first ports of the relay device so that the ports included in the second ports and coupled via any of the first ports to the ports that are included in the switch-side ports of the switch devices and that are in use are collectively coupled with the switch device other than the at least one of the switch devices.

9. The control device according to claim 7, wherein the port-assignment control unit controls switching of the connections between the second ports and the first ports of the relay device so that the ports included in the second ports and coupled via any of the first ports to the ports that are included in the switch-side ports of the switch devices and that are not in use are collectively coupled with a monitor port that is included in the switch device other than the at least one of the switch devices and that monitors, upon connection with any of the second ports via any of the first ports, presence/absence of input/output of the data.

10. The control device according to claim 9, wherein the port monitoring unit monitors a usage state of the monitor port, and when starting of use of the port included in the second ports and coupled with the monitor port via any of the first ports is detected on a basis of a result of the monitoring, the port-assignment control unit controls switching of the connections between the second ports and the first ports of the relay device so that the port started to be used is coupled with any of the switch-side ports of the switch device other than the at least one of the switch devices.

11. The control device according to claim 9, wherein the port monitoring unit monitors a usage state of the monitor port, and when starting of use of the port included in the second ports and coupled with the monitor port via any of the first ports is detected on a basis of a result of the monitoring, the power control unit starts the supply of the power to the at least one of the switch devices to which the power is stopped from being supplied, and
the port-assignment control unit controls switching of the connections between the second ports and the first ports of the relay device so that the port started to be used is coupled with any of the switch-side ports of the at least one of the switch devices to which the power is started to be supplied.

12. The control device according to claim 7, wherein, during control of the switching of the connections between the second ports and the first ports of the relay device, the port-assignment control unit deletes information of the switch devices, and
the information is regarding an association between the switch-side ports and the destination information.

13. A composite switch device, comprising:
switch devices that operate on supplied power, each of the switch devices including multiple switch-side ports and a communication processing unit for relaying data input to any of the switch-side ports on a basis of destination information set for the data; and
a relay device that includes first ports coupled with the corresponding switch-side ports of the switch devices and second ports selectively coupled with the first ports and that relays the data, input to any of the second ports, to any of the first ports, and
wherein the relay device controls switching of connections between the second ports and the first ports of the relay device so that ports included in the second ports and coupled via any of the first ports to the ports that are included in the switch-side ports of the switch devices and that are not in use are collectively coupled with at least one of the switch devices; and
a supply of the power to the at least one of the switch devices in which all of the switch-side ports are put into non-used states by the switching control of the port-assignment control unit is stopped.

14. A control method for a control system having switch devices that operate on supplied power, comprising:
providing each the switch devices with multiple switch-side ports and a communication processing unit for relaying data, input to any of the switch-side ports, to any of the switch-side ports on a basis of destination information set for the data;
providing a relay device that includes first ports coupled with the corresponding switch-side ports of the switch devices and second ports selectively coupled with the first ports and that relays the data, input to any of the second ports, to any of the first ports;
monitoring, by a control device, usage states of the switch-side ports of each of the switch devices;
controlling, by the control device that controls the switch devices and the relay device, on a basis of a result of the monitoring, switching of connections between the second ports and the first ports of the relay device so that ports included in the second ports and coupled via any of the first ports to the ports that are included in the switch-side ports of the switch devices and that are not in use are collectively coupled with at least one of the switch devices; and
stopping, by the control device, a supply of the power to the at least one of the switch devices in which all of the switch-side ports are put into non-used states by the switching control.

15. The control method according to claim 14, wherein the control device controls switching of the connections between the second ports and the first ports of the relay device so that the ports included in the second ports and coupled via any of the first ports to the ports that are included in the switch-side ports of the switch devices and that are in use are collectively coupled with the switch device other than the at least one of the switch devices.

16. The control method according to claim 14, wherein the control device controls switching of the connections between the second ports and the first ports of the relay device so that the ports included in the second ports and coupled via any of the first ports to the ports that are included in the switch-side ports of the switch devices and that are not in use are collectively coupled with a monitor port that is included in the switch device other than the at least one of the switch devices and that monitors, upon connection to any of the second ports via any of the first ports, presence/absence of input/output of the data.

17. The control method according to claim 16, wherein the control device monitors a usage state of the monitor port, and when starting of use of the port included in the second ports and coupled with the monitor port via any of the first ports is detected on a basis of a result of the monitoring, the control device controls switching of the connections between the second ports and the first ports of the relay device so that the port started to be used is coupled with any of the switch-side ports of the switch device other than the at least one of the switch devices.

18. The control method according to claim 16, wherein the control device monitors a usage state of the monitor port, and when starting of use of the port included in the second ports and coupled with the monitor port via any of the first ports is detected on a basis of a result of the monitoring, the control device starts the supply of the power to the at least one of the switch devices to which the power is stopped from being supplied and controls switching of the connections between the second ports and the first ports of the relay device so that the port started to be used is coupled with any of the switch-side ports of the at least one of the switch devices to which the power is started to be supplied.

19. The control method according to claim 14, wherein, during control of the switching of the connections between the second ports and the first ports of the relay device, the control device deletes information of switch devices, and the information is regarding an association between the switch-side ports and the destination information.

20. A control method for a control system having switch devices that operate on supplied power, comprising:

relaying data to any of switch-side ports provided to each of the switch devices based on destination information set for the data;

providing a relay device that includes first ports coupled with corresponding switch-side ports of the switch devices and second ports selectively coupled with the first ports that relays the data, input to any of the second ports, to any of the first ports;

causing the relay device to control switching of connections between the second ports and the first ports of the relay device so that the ports included in the second ports and coupled via any of the first ports to the ports that are included in the switch-side ports of the switch devices and that are not in use are collectively coupled with at least one of the switch devices; and stopping a supply of the power to the at least one of the switch devices in which all of the switch-side ports are put into non-used states by the switching control.

* * * * *

UNITED STATES PATENT AND TRADEMARK OFFICE
CERTIFICATE OF CORRECTION

| | | |
|---|---|---|
| PATENT NO. | : 8,644,179 B2 | Page 1 of 1 |
| APPLICATION NO. | : 13/049127 | |
| DATED | : February 4, 2014 | |
| INVENTOR(S) | : Yamada | |

It is certified that error appears in the above-identified patent and that said Letters Patent is hereby corrected as shown below:

In the Claims

Column 19, Line 62, In Claim 3, after "one" insert -- of --.
Column 22, Line 3, In Claim 14, after "each" insert -- of --.

Signed and Sealed this
Twenty-seventh Day of May, 2014

Michelle K. Lee
*Deputy Director of the United States Patent and Trademark Office*